US012596802B2

(12) United States Patent
Long et al.

(10) Patent No.: US 12,596,802 B2
(45) Date of Patent: Apr. 7, 2026

(54) MALWARE DETECTION TECHNIQUES

(71) Applicant: Dell Products L.P., Hopkinton, MA (US)

(72) Inventors: Matthew Long, Pocasset, MA (US); Elik Levin, Modi'In (IL); Arieh Don, Newton, MA (US)

(73) Assignee: Dell Products L.P., Hopkinton, MA (US)

( * ) Notice: Subject to any disclaimer, the term of this patent is extended or adjusted under 35 U.S.C. 154(b) by 104 days.

(21) Appl. No.: 18/622,022

(22) Filed: Mar. 29, 2024

(65) Prior Publication Data

US 2025/0307395 A1 Oct. 2, 2025

(51) Int. Cl.
G06F 21/00 (2013.01)
G06F 21/56 (2013.01)

(52) U.S. Cl.
CPC ..................................... G06F 21/56 (2013.01)

(58) Field of Classification Search
CPC ....................................................... G06F 21/56
See application file for complete search history.

(56) References Cited

U.S. PATENT DOCUMENTS

| | | | | |
|---|---|---|---|---|
| 9,565,209 | B1 * | 2/2017 | Grzonkowski | H04L 51/046 |
| 9,690,937 | B1 * | 6/2017 | Duchin | G06F 21/562 |
| 9,747,446 | B1 * | 8/2017 | Pidathala | G06F 21/56 |
| 9,967,282 | B2 * | 5/2018 | Thomas | H04L 63/20 |
| 10,009,370 | B1 * | 6/2018 | Douglas | G06F 21/566 |
| 10,044,675 | B1 * | 8/2018 | Ettema | H04L 63/0227 |
| 10,419,449 | B1 * | 9/2019 | Agranonik | H04L 63/1441 |
| 10,574,683 | B1 * | 2/2020 | Ghosh | H04L 63/1425 |
| 10,587,647 | B1 * | 3/2020 | Khalid | H04L 63/1416 |
| 10,630,703 | B1 * | 4/2020 | Ghosh | H04L 63/1408 |
| 10,630,704 | B1 * | 4/2020 | Ghosh | H04L 63/1416 |
| 10,630,715 | B1 * | 4/2020 | Ghosh | H04L 63/1425 |

(Continued)

OTHER PUBLICATIONS

U.S. Appl. No. 17/494,875, filed Oct. 6, 2021, entitled Ransomware Detection in Host Encrypted Data Environment, Arieh Don, et al.

(Continued)

*Primary Examiner* — Don G Zhao
(74) *Attorney, Agent, or Firm* — BainwoodHuang

(57) ABSTRACT

In at least one embodiment, processing can include: detecting a first unexpected change to a first characteristic for a first storage object (SO); detecting no unexpected change to the first characteristic for a second SO; and responsive to said detecting the first unexpected change, performing first processing including: detecting a second unexpected change to a second characteristic for the first SO; creating an indication of compromise (IOC) including a signature characterizing behavior of suspected malware activity impacting the first SO, the signature including the first and second unexpected changes; detecting a third unexpected change to the second characteristic with respect to the second SO; determining, in accordance with criteria, that unexpected changes in I/O activity of the second SO match the IOC, wherein the unexpected changes include the third unexpected change; and responsive to determining the unexpected changes match the IOC, determining suspected malware activity impacting the second SO.

20 Claims, 7 Drawing Sheets

400

V1 Profile 402

402a CR = CRV1

402b R/W ratio = RWV1

402c write I/O size = WV1

402d write I/O rate = WIOPSV1

Observed characteristic values for V1 412

412a CR = UV1

412b R/W ratio = UV2

412c write I/O size = UV3

412d write I/O rate = UV4

V2 Profile 404

404a CR = CRV2

404b R/W ratio = RWV2

404c write I/O size = WV2

404d write I/O rate = WIOPSV2

Observed characteristic values for V2 414

414a CR = CRV2

414b R/W ratio = UV12

414c write I/O size = UV13

414d write I/O rate = UV14

(56) References Cited

U.S. PATENT DOCUMENTS

| | | | | | |
|---|---|---|---|---|---|
| 10,630,716 | B1 * | 4/2020 | Ghosh | | H04L 63/1408 |
| 2015/0135316 | A1 * | 5/2015 | Tock | | G06F 21/566 |
| | | | | | 726/23 |
| 2015/0135317 | A1 * | 5/2015 | Tock | | G06F 21/56 |
| | | | | | 726/23 |
| 2015/0244730 | A1 * | 8/2015 | Vu | | G06F 21/566 |
| | | | | | 726/24 |
| 2017/0366582 | A1 * | 12/2017 | Kothekar | | H04L 63/1425 |
| 2018/0004942 | A1 * | 1/2018 | Martin | | G06F 21/554 |
| 2018/0293176 | A1 * | 10/2018 | Borlick | | G06F 21/55 |
| 2019/0080088 | A1 * | 3/2019 | Tock | | G06F 21/56 |
| 2020/0092306 | A1 * | 3/2020 | Jusko | | G06F 16/285 |
| 2020/0151332 | A1 * | 5/2020 | Tock | | G06F 21/56 |
| 2020/0204572 | A1 * | 6/2020 | Jeyakumar | | G06F 21/561 |
| 2020/0322361 | A1 * | 10/2020 | Ravindra | | G06F 40/279 |
| 2020/0344251 | A1 * | 10/2020 | Jeyakumar | | H04L 51/212 |
| 2020/0389486 | A1 * | 12/2020 | Jeyakumar | | G06F 16/353 |
| 2020/0396258 | A1 * | 12/2020 | Jeyakumar | | G06N 20/00 |
| 2021/0006573 | A1 * | 1/2021 | Britt | | G06F 21/31 |
| 2021/0194853 | A1 * | 6/2021 | Xiao | | H04L 43/028 |
| 2021/0194925 | A1 * | 6/2021 | Xiao | | H04L 63/0227 |
| 2022/0019670 | A1 * | 1/2022 | Moriarty | | G06F 21/554 |
| 2022/0131889 | A1 * | 4/2022 | Scheideler | | H04L 63/20 |
| 2022/0414217 | A1 * | 12/2022 | Tock | | G06F 21/56 |
| 2023/0281300 | A1 * | 9/2023 | Prochazka | | G06F 21/55 |
| | | | | | 726/23 |
| 2024/0104208 | A1 * | 3/2024 | Nuthakki | | G06F 11/3006 |
| 2024/0386109 | A1 * | 11/2024 | Kurtz | | G06F 21/566 |
| 2024/0427887 | A1 * | 12/2024 | Sumpter | | G06F 21/56 |
| 2025/0039228 | A1 * | 1/2025 | Crabtree | | H04L 63/1433 |
| 2025/0233870 | A1 * | 7/2025 | Hong | | H04L 63/1416 |

OTHER PUBLICATIONS

U.S. Appl. No. 18/358,272, filed Jul. 25, 2023, entitled Managing Threats To Data Storage in Distributed Environments, Arieh Don, et al.

* cited by examiner

300

SO Profile 302

Characteristics 302a

Expected values of characteristics for SO 302b

Profile matching criteria 303b

IOC 304

Signature 304a

Metadata (MD) 304b

IOC matching criteria 304c

Observed characteristic values for V1 412

412a CR = UV1

412b R/W ratio = UV2

412c write I/O size = UV3

412d write I/O rate = UV4

Observed characteristic values for V2 414

414a CR = CRV2

414b R/W ratio = UV12

414c write I/O size = UV13

414d write I/O rate = UV14

V1 Profile 402

402a CR = CRV1

402b R/W ratio = RWV1

402c write I/O size = WV1

402d write I/O rate = WIOPSV1

V2 Profile 404

404a CR = CRV2

404b R/W ratio = RWV2

404c write I/O size = WV2

404d write I/O rate = WIOPSV2

400

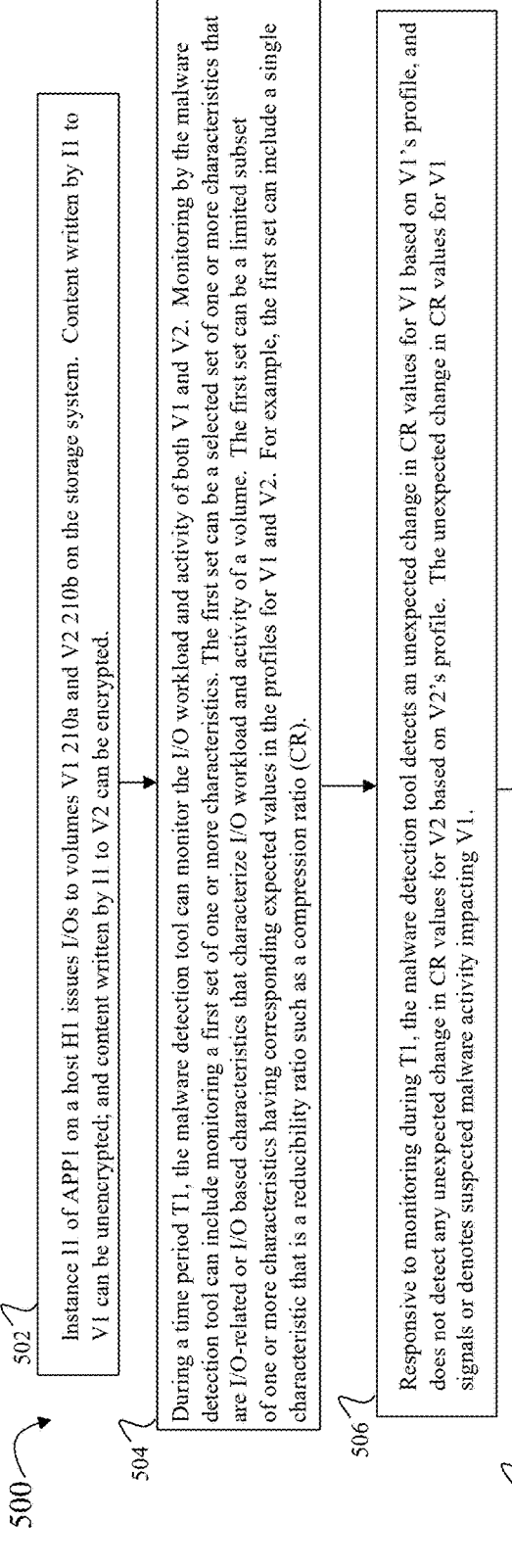

Instance I1 of APP1 on a host H1 issues I/Os to volumes V1 210a and V2 210b on the storage system. Content written by I1 to V1 can be unencrypted; and content written by I1 to V2 can be encrypted.

502

500

During a time period T1, the malware detection tool can monitor the I/O workload and activity of both V1 and V2. Monitoring by the malware detection tool can include monitoring a first set of one or more characteristics. The first set can be a selected set of one or more characteristics that are I/O-related or I/O based characteristics that characterize I/O workload and activity of a volume. The first set can be a limited subset of one or more characteristics having corresponding expected values in the profiles for V1 and V2. For example, the first set can include a single characteristic that is a reducibility ratio such as a compression ratio (CR).

504

Responsive to monitoring during T1, the malware detection tool detects an unexpected change in CR values for V1 based on V1's profile, and does not detect any unexpected change in CR values for V2 based on V2's profile. The unexpected change in CR values for V1 signals or denotes suspected malware activity impacting V1.

506

As a result of detecting the unexpected change in CR values for V1 and suspecting malware activity, an additional set of one or more additional characteristics can be monitored by the malware detection tool for V1 and V2 during a second time period T2. The additional set can include I/O-related or I/O based characteristics that characterize I/O workload and activity of a volume. Characteristic of the additional set can have corresponding expected values in the profiles for V1 and V2. For example, the additional set can include the following characteristics: R/W ratio, write I/O size and write I/O rate. During T2, the malware detection tool can also continue to monitor the one or more characteristics of the first set with respect to V1 and V2 along with the additional characteristics of the additional characteristic set.

During T2, monitoring characteristics of the additional set with respect to V1 can be performed to gather or collect additional I/O-related behavioral or activity information regarding observed unexpected changes in I/O workload or activity of V1, where such unexpected changes can be used to further characterize and define the behavior or signature of the suspected malware impacting V1.

508

An IOC can be created, such as by the storage system, for the suspected malware activity impacting V1. The IOC can include a signature based on the unexpected changes observed with respect to characteristics of the first set and the additional set for V1. The IOC can also include MD including other information regarding V1. The MD can include information identifying any of: the application or application type APP1; the host H1 upon which I1 of APP1 executes; other hosts that access or use (e.g., read from and/or write to) V1; and other hosts with other instances of the same application/application type APP1 that access or use V1.

510

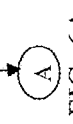

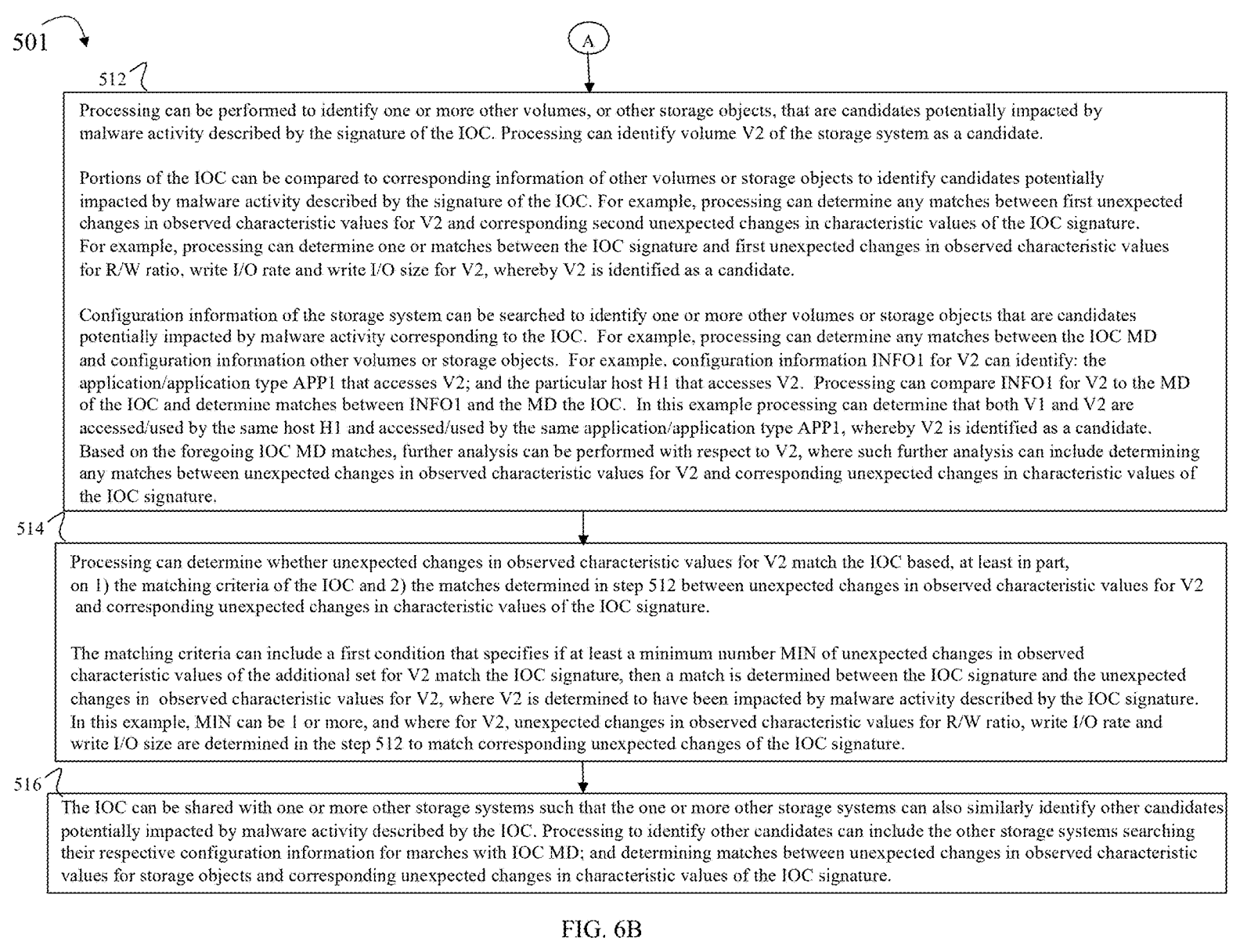

Processing can be performed to identify one or more other volumes, or other storage objects, that are candidates potentially impacted by malware activity described by the signature of the IOC. Processing can identify volume V2 of the storage system as a candidate.

Portions of the IOC can be compared to corresponding information of other volumes or storage objects to identify candidates potentially impacted by malware activity described by the signature of the IOC. For example, processing can determine any matches between first unexpected changes in observed characteristic values for V2 and corresponding second unexpected changes in characteristic values of the IOC signature. For example, processing can determine one or matches between the IOC signature and first unexpected changes in observed characteristic values for R/W ratio, write I/O rate and write I/O size for V2, whereby V2 is identified as a candidate.

Configuration information of the storage system can be searched to identify one or more other volumes or storage objects that are candidates potentially impacted by malware activity corresponding to the IOC. For example, processing can determine any matches between the IOC MD and configuration information other volumes or storage objects. For example, configuration information INFO1 for V2 can identify: the application/application type APP1 that accesses V2; and the particular host H1 that accesses V2. Processing can compare INFO1 for V2 to the MD of the IOC and determine matches between INFO1 and the MD the IOC. In this example processing can determine that both V1 and V2 are accessed/used by the same host H1 and accessed/used by the same application/application type APP1, whereby V2 is identified as a candidate. Based on the foregoing IOC MD matches, further analysis can be performed with respect to V2, where such further analysis can include determining any matches between unexpected changes in observed characteristic values for V2 and corresponding unexpected changes in characteristic values of the IOC signature.

514

Processing can determine whether unexpected changes in observed characteristic values for V2 match the IOC based, at least in part, on 1) the matching criteria of the IOC and 2) the matches determined in step 512 between unexpected changes in observed characteristic values for V2 and corresponding unexpected changes in characteristic values of the IOC signature.

The matching criteria can include a first condition that specifies if at least a minimum number MIN of unexpected changes in observed characteristic values of the additional set for V2 match the IOC signature, then a match is determined between the IOC signature and the unexpected changes in observed characteristic values for V2, where V2 is determined to have been impacted by malware activity described by the IOC signature. In this example, MIN can be 1 or more, and where for V2, unexpected changes in observed characteristic values for R/W ratio, write I/O rate and write I/O size are determined in the step 512 to match corresponding unexpected changes of the IOC signature.

516

The IOC can be shared with one or more other storage systems such that the one or more other storage systems can also similarly identify other candidates potentially impacted by malware activity described by the IOC. Processing to identify other candidates can include the other storage systems searching their respective configuration information for matches with IOC MD; and determining matches between unexpected changes in observed characteristic values for storage objects and corresponding unexpected changes in characteristic values of the IOC signature.

FIG. 6B

MALWARE DETECTION TECHNIQUES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: monitoring I/O activity of a first storage object for changes to a first characteristic set of one or more I/O activity characteristics with respect to the first storage object; monitoring I/O activity of a second storage object for changes to the first characteristic set with respect to the second storage object; detecting a first unexpected change to a first characteristic of the first characteristic set with respect to the first storage object, wherein said first unexpected change indicates first suspected malware activity by first malware impacting the first storage object; detecting no unexpected change to the first characteristic with respect to the second storage object; and responsive to said detecting the first unexpected change, performing first processing including: monitoring I/O activity of the first storage object for changes to an additional characteristic set of one or more additional I/O activity characteristics with respect to the first storage object, wherein the additional characteristic set includes a second characteristic; detecting a second unexpected change to the second characteristic with respect to the first storage object, wherein said second unexpected change indicates the first suspected malware activity by the first malware impacting the first storage object; creating a first indication of compromise (IOC) record for the first suspected malware activity by the first malware impacting the first storage object, wherein the first IOC record includes a first signature characterizing behavior of the first suspected malware activity by the first malware impacting the first storage object, wherein the first signature includes the first unexpected change to the first characteristic and also includes the second unexpected change to the second characteristic; monitoring I/O activity of the second storage object for changes to the additional characteristic set with respect to the second storage object; detecting a third unexpected change to the second characteristic with respect to the second storage object; determining, in accordance with one or more IOC matching criteria, that a first set of one or more unexpected changes in I/O activity of the second storage object matches the first IOC record, wherein the first set of one or more unexpected changes in I/O activity of the second storage object includes the third unexpected change; and responsive to determining that the first set of one or more unexpected changes in I/O activity of the second storage object matches the first IOC record, determining second suspected malware activity by the first malware impacting the second storage object.

In at least one embodiment, determining that the first set of one or more unexpected changes in I/O activity of the second storage object matches the first IOC record can further include determining that the third unexpected change, to the second characteristic with respect to the second storage object, matches the second unexpected change, to the second characteristic with respect to the first storage object, that is included in the first signature of the first IOC record. A first I/O profile can describe expected I/O activity and behavior for the first storage object, wherein the first I/O profile includes first information specifying first one or more expected values, respectively, for the one or more I/O activity characteristics of the first set with respect to the first storage object, and wherein the first I/O profile includes second information specifying second one or more expected values, respectively, for the one or more additional I/O activity characteristics of the additional characteristic set with respect to the first storage object. The first unexpected change can indicate that the first characteristic for the first storage object changed from a first expected value to a first unexpected value, and wherein the second unexpected change can indicate that the second characteristic for the first storage object changed from a second expected value to a second unexpected value. The first expected value can be included in the first one or more expected values of the first I/O profile. The second expected value can be included in the second one or more expected values of the first I/O profile. The first unexpected value and the second unexpected value can be determined in accordance with information regarding current I/O activity of the first storage object obtained, respectively, in monitoring I/O activity of the first storage object for changes to the first characteristic set and monitoring I/O activity of the first storage object for changes to the additional characteristic set.

In at least one embodiment, detecting the first unexpected change to the first characteristic with respect to the first storage object can further include: determining that the first unexpected value does not fall into a first specified value range including the first expected value, wherein the first specified value range is included in the first I/O profile of the first storage object; and wherein said detecting the second unexpected change to the second characteristic with respect to the first storage object can further include: determining that the second unexpected value does not fall into a second specified value range including the second expected value, wherein the second specified value range is included in the first I/O profile of the first storage object.

In at least one embodiment, a second I/O profile can describe expected I/O activity and behavior for the second storage object. The second I/O profile can include third information specifying third one or more expected values, respectively, for the one or more I/O activity characteristics of the first set with respect to the second storage object. The second I/O profile can include fourth information specifying fourth one or more expected values, respectively, for the one or more additional I/O activity characteristics of the additional characteristic set with respect to the second storage object. The third unexpected change can indicate that the second characteristic for the second storage object changed from a third expected value to a third unexpected value. The expected value can be included in the fourth one or more expected values of the second I/O profile, and the third unexpected value can be determined in accordance with information regarding current I/O activity of the second storage object obtained in monitoring I/O activity of the second storage object for changes to the additional characteristic set with respect to the second storage object.

In at least one embodiment, detecting the third unexpected change to the second characteristic with respect to the second storage object can include determining that the third unexpected value does not fall within a third specified value range including the third expected value, wherein the third specified value range is included in the second profile. The third one or more expected values of the second I/O profile can include a fourth expected value denoting an expected value of the first characteristic with respect to the second storage object. A fifth value for the first characteristic with respect to the second storage object can be determined in accordance with information regarding current I/O activity of the second storage object obtained in monitoring I/O activity of the second storage object for changes to the first characteristic set with respect to the second storage object. Detecting no unexpected change to the first characteristic with respect to the second storage object further can include determining that the fifth value falls within a fourth specified value range including the fourth expected value, wherein the fourth specified value range is included in the second I/O profile.

In at least one embodiment, the second unexpected change can indicate that the second characteristic for the first storage object changed from a second expected value to a second unexpected value. The second unexpected change can be denoted in the first signature of the first IOC record by including the second unexpected value in the first signature of the first IOC record. Determining that the third unexpected change to the second characteristic with respect to the second storage object matches the second unexpected change included in the first signature of the first IOC record can further includes determining that the third unexpected value, of the second characteristic for the second storage object, is a match for the second unexpected value, of the second characteristic for the first storage object, as included in the first signature of the first IOC record, comprising: determining that the third unexpected value of the second characteristic for the second storage object falls within a fifth specified value range, wherein the fifth specified value range also includes the second unexpected value, of the second characteristic for the first storage object, as included in the first signature of the first IOC record, wherein the fifth specified value range is included in the one or more IOC matching criteria of the first IOC record.

In at least one embodiment, the one or more IOC matching criteria of the first IOC record can specify one or more criteria used in determining whether the first set of one or more unexpected changes in I/O activity of the second storage object matches the first IOC record. The one or more matching criteria of the first IOC record can include any of: a first condition specifying that at least a first minimum number of unexpected changes in I/O activity of the first set for the second storage object match the first signature in order to determine that the first set matches the first IOC record; a second condition specifying that at least a second minimum number of characteristics of the first characteristic set have first corresponding unexpected changes in the first set which match the first signature in order to determine that the first set matches the first IOC record; and a third condition specifying that at least a third minimum number of characteristics of the additional characteristic set have second corresponding unexpected changes in the first set which match the first signature in order to determine that the first set matches the first IOC record.

In at least one embodiment, the first IOC record can further include first metadata (MD) comprising environmental information regarding the first storage object. The environmental information of the first MD can include first information identifying one or more hosts using or accessing the first storage object, second information identifying an application that issues I/Os to the first storage object, wherein each of the one or more hosts, as identified in the first information, includes at least one instance of the application executing on said each host, and third information that identifies, for each of the one or more hosts, at least one host operating system upon which one or more instances of the application execute on said each host. Processing can include: identifying a third storage object having one or more associated properties matching one or more corresponding elements of the environmental information of the first IOC record; monitoring I/O activity of the third storage object for changes to the first characteristic set and the additional characteristic set with respect to the third storage object; and determining whether the third storage object has one or more corresponding changes to one or more characteristics matching respective one or more changes of the first signature of the first IOC record.

In at least one embodiment, each of the first storage object and the second storage object is any of: a volume, a logical device, a data set, and a storage group defining a logical grouping of one or more volumes or logical devices. The first storage object and the second storage object can be included in a storage system; wherein first content, that is directed to the first storage object and that is written by one or more hosts sending first writes to the storage system, is expected to be in an unencrypted form when received by the storage system; and wherein second content, that is directed to the second storage object and that is written by one or more hosts sending second writes to the storage system, is expected to be host-encrypted by a respective sending host when received by the storage system. The first characteristic set of one or more I/O activity characteristics can include one or more reducibility ratios. The first characteristic of the first characteristic set can be a first reducibility ratio that is any of a compression ratio and a data deduplication ratio. Each characteristic of the additional characteristic set of one or more additional I/O activity characteristics can be any of:

read I/O size, write I/O size, read/write workload mixture or ratio, percentage or portion of I/O workload that are reads, percentage or portion of I/O workload that are writes, I/O pattern characteristics, read I/O workload classification as sequential or random, write I/O workload classification as sequential or random, overall host I/O rate, host write I/O rate, host read I/O rate, I/O locality of reference identifying particular logical addresses accessed by received I/O operations, read I/O locality of reference identifying particular logical addresses accessed by received read I/O operations, and write I/O locality of reference identifying particular logical addresses accessed by received write I/O operations.

In at least one embodiment, the first unexpected change can denote an unexpected change between a first expected value and a first unexpected value of the first reducibility ratio with respect to the first storage object, wherein the first unexpected value of the first reducibility ratio is obtained in connection with monitoring I/O activity of the first storage object for changes to the first characteristic set of one or more I/O activity characteristics with respect to the first storage object. The first expected value of the first reducibility ratio with respect to the first storage object can be included in a first I/O profile describing expected I/O activity of the first storage object. Detecting the first unexpected change can further include determining that the first unexpected value of the first reducibility ratio does not fall within a fifth specified value range including the first expected value, wherein the fifth expected value range can be included in the first I/O profile of the first storage object.

In at least one embodiment, a second profile, that describes expected I/O activity of the second storage object, can include a second expected value of the first reducibility ratio with respect to the second storage object. A third value of the first reducibility ratio with respect to the second storage object can be obtained in connection with monitoring I/O activity of the second storage object for changes to the first characteristic set with respect to the second storage object. Detecting no unexpected change to the first characteristic with respect to the second storage object can include determining that the second expected value of the second I/O profile matches the third value, comprising determining that the third value falls within a sixth specified value range including the second expected value, wherein the sixth specified value range is included in the second profile. Detecting the first unexpected change to the first characteristic of the first characteristic set with respect to the first storage object can indicate that the first storage object is identified as a candidate that has been potentially corrupted, invalidated, compromised and/or modified by the first malware. Processing can include performing data validation processing of the first storage object to determine whether the first storage object has actually been corrupted, invalidated, compromised and/or modified. Determining that the second suspected malware activity has impacted the second storage object can indicate that the second storage object is identified as a candidate that has been potentially corrupted, invalidated, comprised and/or modified by the first malware that also potentially corrupted, invalidated, compromised and/or modified the first storage object. Processing can include performing data validation processing of the second storage object to determine whether the second storage object has actually been corrupted, invalidated, compromised and/or modified.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 6A and 6B are flowcharts of processing steps that can be performed in at least one embodiment in accordance with the techniques of the present disclosure.

DETAILED DESCRIPTION OF EMBODIMENT(S)

Figure 1:
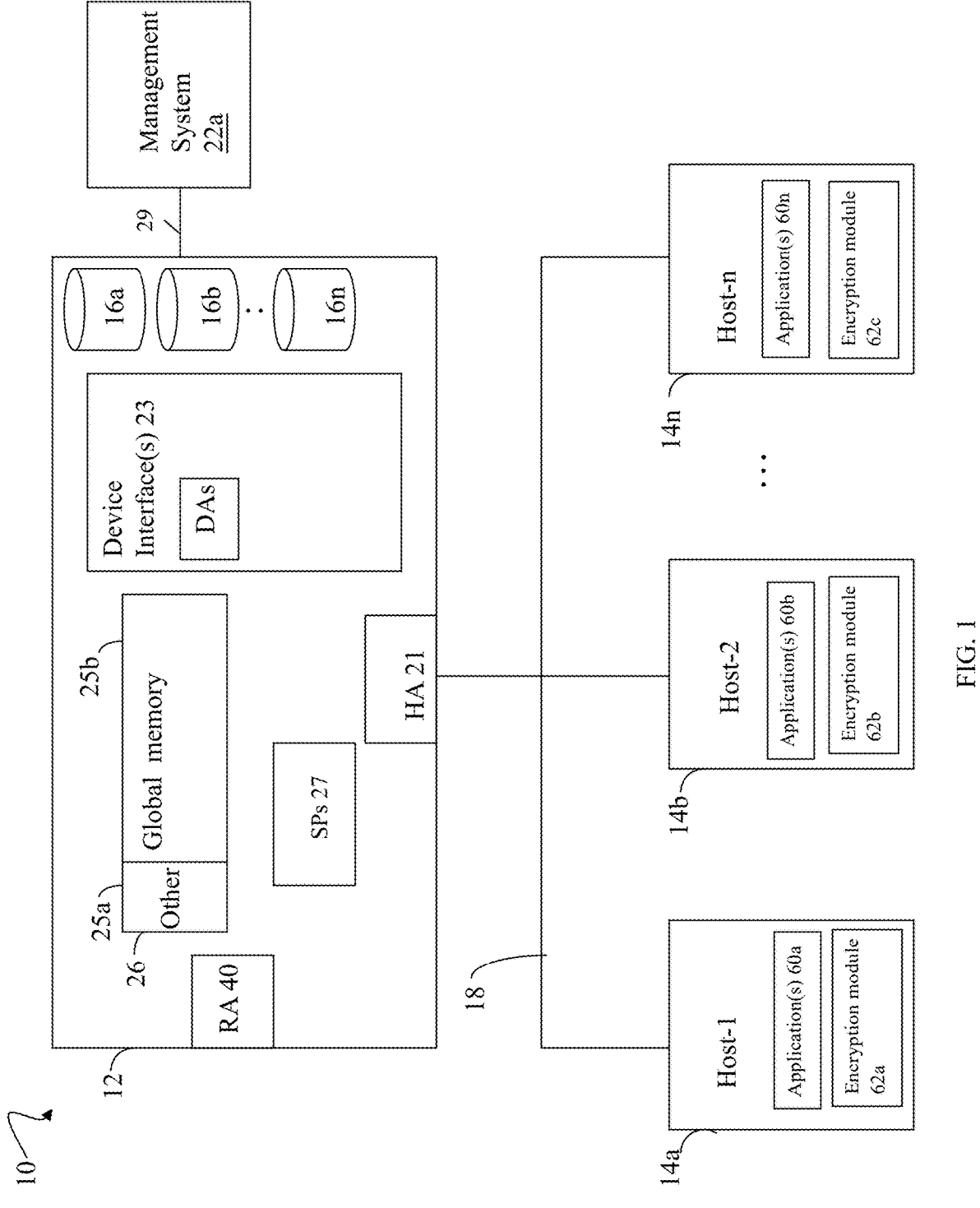
FIGS. 1, 3, 4 and 5 are examples of components and data that may be included in systems in at least one embodiment in accordance with the techniques of the present disclosure.

Systems, such as data storage systems or appliances, can use different malware detection methodologies or techniques. The malware detection methodologies or techniques can be used to identify when data of one or more volumes or devices has been invalidated, modified or compromised, or is otherwise suspected of being potentially invalidated, modified, or compromised, such as by malware. One malware detection technique can monitor the reducibility of data written to one or more volumes and can detect changes or variations in data reducibility, where such detected changes or variations in data reducibility can indicate that malware has compromised or modified the data. Data reduction techniques can include data compression and/or data deduplication (sometimes referred to simply as deduplication). A compression ratio may be defined as the ratio between the uncompressed size of data (e.g., size of the original data as prior to compression) and the compressed size of data (e.g., size of the compressed form of data as after compression). For example, a compression ratio of 20:1 means that 20 units of uncompressed data can be stored as a single unit of compressed data. In a similar manner, a deduplication (dedup) ratio is a measurement of the amount of data reduction achieved by data deduplication. The dedup ratio may be defined as the ratio between the size of original data (as prior to deduplication) and the size of resulting deduplicated data (e.g., size of the deduplicated form of data as after performing deduplication). For example, a dedup ratio of 20:1 means that units of data (as prior to deduplication) can be stored as a single unit of deduplicated data.

Generally, data generated and used by different individual applications or programs typically exhibit different reducibility characteristics in terms of compression and/or dedup ratios. However, an individual application or program (e.g., such as a particular email program or database application) tends to create and store data having corresponding compression ratios and dedup ratios within a predictable expected range or variation. Additionally, individual storage objects or volumes used by a single particular application or program can similarly tend to store application data having corresponding compression ratios and dedup ratios within a predictable expected range or variation (e.g., specified tolerance or range). For example, a database application can use a log device or volume and a database content device or volume, where the log volume of the database application logs or records database transactions (e.g., records changes made to the database) and can be used for recovery operations, and where the database content volume of the database application can be used for storing the data or contents stored in the database records and/or tables. For example, a first change to a field of a database record from VAL1 to VAL2 can be recorded in the log volume, where the first change, when committed to the database, results in updating the database content volume to store the current value of VAL2 in a database table or structure. Generally, the log volume of the database application can be expected, over time, to have first corresponding compression ratios and first corresponding dedup ratios within first corresponding predictable expected ranges or variations; and the database content volume can be expected, over time to have second corresponding compression ratios and second corresponding dedup ratios within second corresponding predictable expected ranges or variations. The particular compression and dedup ratios expected for the database log volume can be different from other particular compression and dedup ratios expected for the database content volume. The expected range and allowable variation of the particular compression and dedup ratios expected for the database log volume can be different from the expected range and allowable variation of the other particular compression and dedup ratios expected for the database content volume.

The compressibility and/or deduplicability of data can change as a result of malicious encryption of the data. Encryption generally converts original data into high-entropy data, usually indistinguishable from a random stream thereby having reduced or minimal repeated data patterns. However, compression and data deduplication generally rely on repeated data patterns in order to achieve gains in size reduction. Thus, maliciously encrypted data may become less compressible or have fewer data redundancies available for deduplication. For example, after data to be sent to the storage system for storing on a volume is generated by a host, a malicious entity or malware may modify the data at some point after generation and prior to the data being stored on the storage system. In the context of malware-based attacks, the malicious entity may encrypt the data using a secret cypher, secret key and/or secret encryption technique where the malware encrypted data is then stored on the storage system. Thus, the malware encrypted data may be stored on the storage system rather than the intended form of stored data. Subsequently, if malware encrypted data is then read from storage, the original unencrypted data may not be recovered from the malware encrypted data without use of the secret cypher, secret key and/or secret encryption technique. A malicious party may then attempt to obtain money or extort other concessions in exchange for access to the secret cypher, key or technique to allow recovery of the valid data from the malware encrypted data.

Thus, consistent with discussion above, one malware detection technique can monitor the reducibility of data written to one or more volumes and can detect changes or variations in data reducibility, where such detected changes or variations in data reducibility can indicate that malware has compromised, invalidated or unexpectedly modified the data. In particular, the malware detection technique can monitor the content written to one or more volumes to determine when the compression ratio and/or deduplication ratio of corresponding data changes or deviates beyond expected tolerances or ranges, such as when the compression ratio and/or deduplication ratio decreases by more than a specified amount or tolerance. If the compression ratio and/or deduplication ratio of newly written content of a volume or data set varies beyond specified tolerances or ranges with respect to an existing expected compression ratio and/or deduplication ratio of existing content of the same volume or data set, then processing can identify the newly written content having been generally compromised, invalidated or unexpectedly modified such as by malware (or alternatively is identified as a candidate suspected as having been compromised, invalidated or modified by malware).

The foregoing malware detection technique of monitoring and detecting changes in data reducibility can serve as an indication of malware activity and, more generally, compromised data and/or unexpected data modifications in scenarios where the incoming data received by the storage system is unencrypted (e.g., not expected to be encrypted) such as by a host sending the data. However, if normal data processing includes the host, such as a host agent or application, providing the storage system with encrypted data, then any subsequent re-encryption or undesired modification by malware of the already encrypted data may not result in changes or variations in data reducibility beyond expected tolerances or ranges. Put another way, in normal processing scenarios where the host or application provides the storage system with an encrypted form of data, the foregoing malware detection technique of monitoring and detecting changes in data reducibility may not serve as a good reliable indicator of malware data encryption activity and, more generally compromised data and/or unexpected data modifications made to host-encrypted data.

To overcome at least the foregoing problem or drawback when malware re-encrypts or undesirably modifies host-encrypted data, the techniques of the present disclosure can be used. In at least one embodiment, the techniques of the present disclosure can be used to detect or determine when malware has modified or re-encrypted host-encrypted data, where such host-encrypted data has been validly and intentionally generated as part of normal processing such as by a host or other client providing the host-encrypted data. In at least one embodiment, a host can encrypt data as part of normal processing prior to sending the data in its encrypted form to a storage system.

In at least one embodiment in normal processing (e.g., without malware data modifications or malware encryption), the storage system can expect to receive encrypted data from the host, and the storage system can subsequently properly decrypt the received host-encrypted data to obtain the valid original data (as prior to host encryption). In at least one embodiment, the host providing the storage system with encrypted data can be performed as part of normal processing for any suitable reason such as for security and/or privacy in accordance with specified guidelines, standards and/or policies.

In at least one embodiment, the techniques of the present disclosure can be used to detect when malware has further re-encrypted the host-encrypted data where the re-encrypted data (as re-encrypted by the malware) is received at the storage system. Thus, in at least one embodiment, the storage system can utilize the techniques of the present disclosure to detect such malware re-encryption of host-encrypted data, where the malware re-encrypted data is received by the storage system. More generally, in at least one embodiment, the storage system can utilize the techniques of the present disclosure to detect when the host-encrypted data has been unknowingly modified, such as by malware, to generate modified compromised data (e.g., the malware modified host-encrypted data), where the modified compromised data is received by the storage system.

In at least one embodiment, an IOC or indication of compromise can be created with respect to a first storage object for which malware detection techniques can detect a threat of suspected malware activity. The IOC can be a record that includes a signature of changes in I/O workload and activity characterizing the impact of the suspected malware activity on the first storage object. The IOC signature can include multiple detected value changes to multiple characteristics serving as a fingerprint of the I/O changes detected for the first storage object that define the behavior or signature of the malware. Subsequently, the IOC can be used in connection with determining whether a second different storage object is also suspected of being impacted by malware activity denoted by the IOC. In at least one embodiment, processing can be performed to determine whether the second storage object has one or more unexpected changes to one or more characteristics matching respective one or more unexpected changes of the IOC signature. Thus, for example, where the first storage object's content is unencrypted, and the second storage object's content is encrypted, although the second storage object may not have an unexpected change with respect to a reducibility ratio, the second storage object may have other unexpected changes with respect to other characteristics, where such other unexpected changes match respective changes of the IOC created based on suspected malware activity impacting the first storage object. In this manner in at least one embodiment where the IOC signature includes an unexpected change in a reducibility ratio, a match can be determined between the IOC signature and other unexpected changes of other characteristics (besides any reducibility ratio) with respect to the second storage object.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file system), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12. In the example 10 of FIG. 1, each of the hosts 14a-n can include one or more applications executing thereon. For example, the host 14a can include one or more applications 60a executing thereon; the host 14b can include one or more applications executing thereon; and the host 14n can include one or more applications 60n executing thereon. Each such application on any one of the hosts 14a-n can be any suitable supported application that can vary with embodiment. For example, one or more of the hosts 14a-n can include one or more applications such as any of: an email application, a database application, as well as any other supported application.

In at least one embodiment, each of the hosts 14a-n can also include respective encryption modules 62a-n. A host, such as the host 14a, can use its respective encryption module, such as encryption module 62a, to encrypt data sent to the storage system 12 and also decrypt data received from the storage system 12. The data that is sent to the storage system 12 from a particular one of the hosts 14a-n can be application data written by a respective application 60a-n from the particular one of the hosts 14a-n. For example, a first application of 60a of the host 14a can issue write I/Os that writes content transmitted to the storage system 12. Consistent with other discussion herein in at least one embodiment, each of the write I/Os issued by the first application of 60a can be directed to a particular set of one or more volumes used by the first application instance of the host 14a.

The data received from the storage system 12 by a particular one of the hosts 14a-n can be application data read by a respective application 60a-n from the particular one of the hosts 14a-n. For example, the first application of 60a of the host 14a can issue read I/Os that read content from the storage system 12. Consistent with other discussion herein in at least one embodiment, each of the read I/Os can be directed to a particular set of one or more volumes used by the first application instance of 60a of the host 14a. In response to the read I/Os from the first application of the host 14a, the storage system 12 can return the requested read data or content from the particular volume identified each read I/O.

In at least one embodiment, each of the hosts 14a-n can optionally encrypt at least some of the data sent to the storage system 12. For example, in at least one embodiment, the host 14a can encrypt first application data of one or more applications 60a where the encrypted form of the first application data is sent to the storage system 12. Additionally, the host 14a can send unencrypted application data of one or more applications to the storage system 12. Thus in at least one embodiment, the host 14a can send both host-encrypted application data and host-unencrypted application data to the storage system. Whether a particular host such as the host 14a sends encrypted or unencrypted application data to the storage system can vary with embodiment in accordance with one or more factors (e.g., type of data, desired level of security, sensitivity or importance of the data, and/or compliance with specified security requirements or standards). The encryption performed by the encryption modules 62a-n is legitimate and valid data encryption that can be performed as needed as part of normal data or I/O processing. In a similar manner, decryption performed by the encryption modules 62a-n is legitimate and valid and can be performed as needed as part of normal data or I/O processing. In at least one embodiment, at least some portions of the application data on one or more of the hosts 14a-n can be maintained in an encrypted form on the respective hosts 14a-n for enhanced security, where the respective host can decrypt the encrypted host application data when needed. In at least one embodiment, at least some portions of the application data stored on the storage system 12 can be in an encrypted form for enhanced security, where the storage system can decrypt the encrypted host application data when needed.

It should be noted that any suitable technique can be used in connection with encrypting and decrypting data by the hosts 14a-n and storage system 12. In at least one embodiment, the encryption modules 62a-n respectively of the hosts 14a-n can use various encryption keys to encrypt desired data sent to the storage system 12; and the encryption modules 62a-n respectively of the hosts 14a-n can use various decryption keys to decrypt encrypted data received from the storage system 12.

Symmetric and asymmetric encryption are two different types of encryption that can be utilized in at least one embodiment. Symmetric encryption uses a single key to encrypt and decrypt data, while asymmetric encryption uses two keys, a public key and a private key, to encrypt and decrypt data. Generally an embodiment can support one or more symmetric and/or asymmetric encryption techniques by one or more of the hosts 14a-n.

In at least one embodiment using symmetric encryption where the same single key is used for both encryption and decryption, any of the hosts 14a-n using symmetric encryption can share their respective one or more symmetric encryption/decryption keys with the storage system such that the storage system can decrypt received host-encrypted data, and then perform any desired data reduction technique such as compression and/or deduplication on the decrypted data. In at least one embodiment as may be needed or desired, the storage system can then encrypt the compressed/deduplicated host application data for storage on PDs or physical storage devices of the storage system 12.

In at least one embodiment using asymmetric encryption, any of the hosts 14a-n using asymmetric encryption can encrypt data using its private key where the storage system can subsequently decrypt the received host-encrypted data using a public key corresponding to the particular private key used by the host to encrypt the data. Subsequently, the storage system can perform any desired data reduction technique such as compression and/or deduplication on the decrypted data. The storage system can then encrypt the compressed/deduplicated host application data for storage on PDs of the storage system 12.

Generally in at least one embodiment, the storage system 12 can be provided with the appropriate decryption key that allows the storage system to decrypt host-encrypted received data.

In at least one embodiment, each of the host systems 14a-14n and the data storage system 12 can be physical separate systems. In at least one embodiment, rather than the application executing on a host that is a separate physical system from the storage system, the application of the host can run on processor resources of the storage system (e.g., can run on one or more compute nodes, processor cores or other processor resources of the storage system). In at least one embodiment, the application can execute using cloud server resources of a storage system included in the cloud.

It should be noted that although the element 12 is illustrated as a single data storage system, such as a single data storage array, the element 12 also represents, for example, multiple physical data storage arrays alone, or in combination with, other data storage devices, systems, appliances, and/or components having suitable connectivity to the SAN 10 in an embodiment using the techniques herein. In at least one embodiment, element 12 can represent multiple separate physical storage systems. In at least one embodiment, element 12 an also represent one or more storage systems of one or more data centers. In at least one embodiment, element 12 can represent one or more storage systems and/or one or more data centers, alone or in combination with other components, that are included in a private network, private cloud, public network or public cloud. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices or PDs 16a-16n. The data storage devices 16a-16n include one or more types of non-volatile data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices. In at least one embodiment, at least some of the PDs 16a-n can be used for back-end (BE) non-volatile storage of content or data such as application data sent from hosts 14a-n.

In at least one embodiment, the data storage system can be a data storage array including different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 perform data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device or other non-volatile storage device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs or volumes) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein. In at least one embodiment, the LUNs or volumes of the storage system 12 can be block storage devices accessed by applications 60a-n of the respective hosts 14a-n by issuing read and write I/O operations such as in accordance with one or more supported protocols or standards.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like. In at least one embodiment, at least some of the properties of storage objects, such as LUNs or volumes, can be specified when such storage objects are configured on the storage system. For example, such properties specified when configuring or provisioning storage for LUNs or volumes can include identifying information about the application or application type that will be using the particular LUNs or volumes. For example, when configuring a first volume or LUN for used by a database application of a host, properties specified for the first volume or LUN can identify the particular database application (e.g., such as by vendor, application name, and/or version number) that will using the first volume of LUN. As another example, the properties of the first volume or LUN can identify the particular volume application specific usage by database application. To further illustrates, the database application may use one or more volumes used as log devices for recording database transactions, and may also use one or more additional volumes as database content devices storing database tables or other structures of the actual content of the database. The property information of the first volume or LUN can also identify the particular usage as either a log device or a database content device.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control the path and data paths generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path can each define two separate logical flow paths.

Figure 2:
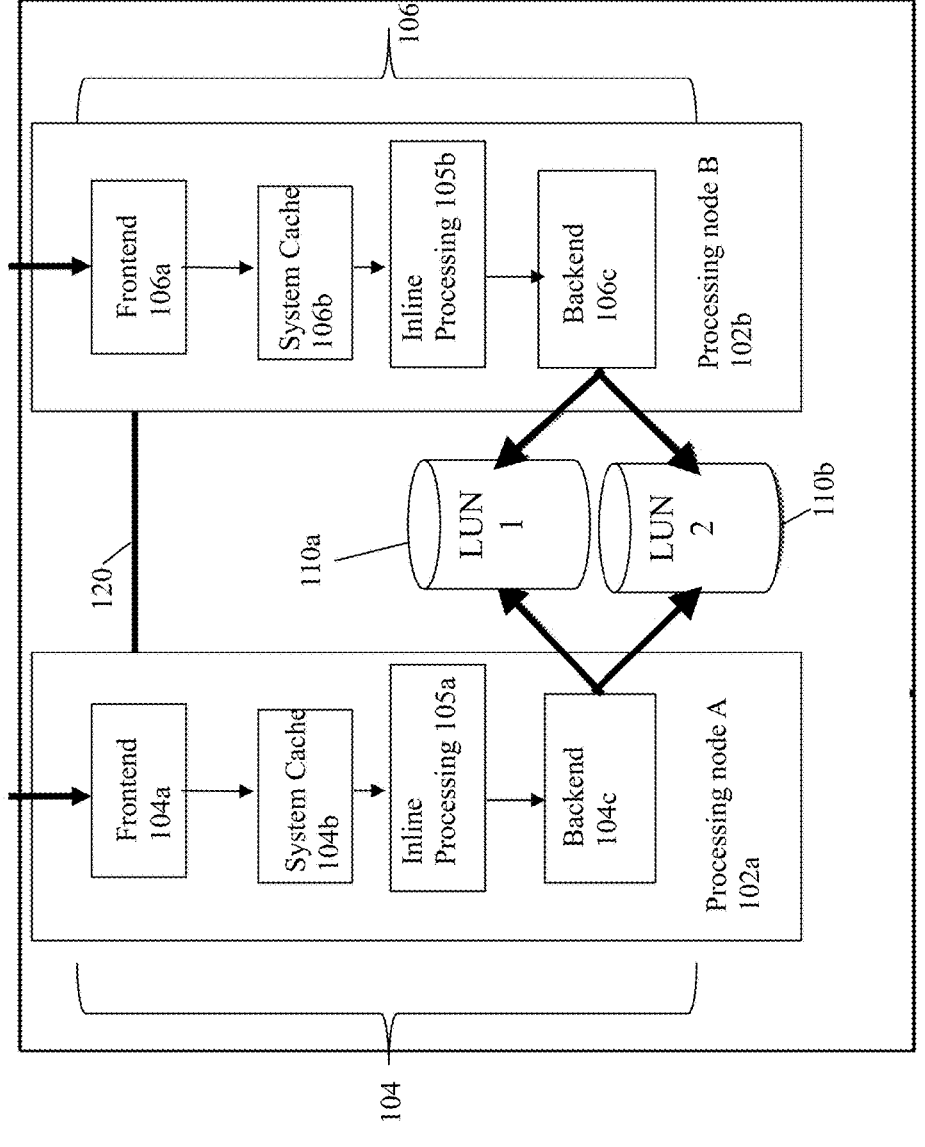
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a*-*b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE nonvolatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

Consistent with other discussion herein, systems, such as data storage systems or appliances, can use different malware detection methodologies or techniques. The malware detection methodologies or techniques can be used to identify when data of one or more volumes or devices has been invalidated, modified or compromised, or is otherwise suspected of being potentially invalidated, modified, or compromised, such as by malware. One malware detection technique can monitor the reducibility of data written to one or more volumes and can detect changes or variations in data reducibility, where such detected changes or variations in data reducibility can indicate that malware has compromised or modified the data. Data reduction techniques can include data compression and/or data deduplication (sometimes referred to simply as deduplication). A compression ratio may be defined as the ratio between the uncompressed size of data (e.g., size of the original data as prior to compression) and the compressed size of data (e.g., size of the compressed form of data as after compression). For example, a compression ratio of 20:1 means that 20 units of uncompressed data can be stored as a single unit of compressed data. In a similar manner, a deduplication (dedup) ratio is a measurement of the amount of data reduction achieved by data deduplication. The dedup ratio may be defined as the ratio between the size of original data (as prior to deduplication) and the size of resulting deduplicated data (e.g., size of the deduplicated form of data as after performing deduplication). For example, a dedup ratio of 20:1 means that 20 units of data (as prior to deduplication) can be stored as a single unit of deduplicated data.

Generally, data generated and used by different individual applications or programs typically exhibit different reducibility characteristics in terms of compression and/or dedup ratios. However, an individual application or program (e.g., such as a particular email program or database application) tends to create and store data having corresponding compression ratios and dedup ratios within a predictable expected range or variation. Additionally, individual storage objects or volumes used by a single particular application or program can similarly tend to store application data having corresponding compression ratios and dedup ratios within a predictable expected range or variation (e.g., specified tolerance or range). For example, a database application can use a log device or volume and a database content device or volume, where the log volume of the database application logs or records database transactions (e.g., records changes made to the database) and can be used for recovery operations, and where the database content volume of the database application can be used for storing the data or contents stored in the database records and/or tables. For example, a first change to a field of a database record from VAL1 to VAL2 can be recorded in the log volume, where the first change, when committed to the database, results in updating the database content volume to store the current value of VAL2 in a database table or structure. Generally, the log volume of the database application can be expected, over time, to have first corresponding compression ratios and first corresponding dedup ratios within first corresponding predictable expected ranges or variations; and the database content volume can be expected, over time to have second corresponding compression ratios and second corresponding dedup ratios within second corresponding predictable expected ranges or variations. The particular compression and dedup ratios expected for the database log volume can be different from other particular compression and dedup ratios expected for the database content volume. The expected range and allowable variation of the particular compression and dedup ratios expected for the database log volume can be different from the expected range and allowable variation of the other particular compression and dedup ratios expected for the database content volume.

The compressibility and/or deduplicability of data can change as a result of malicious encryption of the data. Encryption generally converts original data into high-entropy data, usually indistinguishable from a random stream thereby having reduced or minimal repeated data patterns. However, compression and data deduplication generally rely on repeated data patterns in order to achieve gains in size reduction. Thus, maliciously encrypted data may become less compressible or have fewer data redundancies available for deduplication. For example, after data to be sent to the storage system for storing on a volume is generated by a host, a malicious entity or malware may modify the data at some point after generation and prior to the data being stored on the storage system. In the context of malware-based attacks, the malicious entity may encrypt the data using a secret cypher, secret key and/or secret encryption technique where the malware encrypted data is then stored on the storage system. Thus, the malware encrypted data may be stored on the storage system rather than the intended form of stored data. Subsequently, if malware encrypted data is then read from storage, the original unencrypted data may not be recovered from the malware encrypted data without use of the secret cypher, secret key and/or secret encryption technique. A malicious party may then attempt to obtain money or extort other concessions in exchange for access to the secret cypher, key or technique to allow recovery of the valid data from the malware encrypted data.

Thus, consistent with discussion above, one malware detection technique can monitor the reducibility of data written to one or more volumes and can detect changes or variations in data reducibility, where such detected changes or variations in data reducibility can indicate that malware has compromised, invalidated or unexpectedly modified the data. In particular, the malware detection technique can monitor the content written to one or more volumes to determine when the compression ratio and/or deduplication ratio of corresponding data changes or deviates beyond expected tolerances or ranges, such as when the compression ratio and/or deduplication ratio decreases by more than a specified amount or tolerance. If the compression ratio and/or deduplication ratio of newly written content of a volume or data set varies beyond specified tolerances or ranges with respect to an existing expected compression ratio and/or deduplication ratio of existing content of the same volume or data set, then processing can identify the newly written content having been generally compromised, invalidated or unexpectedly modified such as by malware (or alternatively is identified as a candidate suspected as having been compromised, invalidated or modified by malware).

The foregoing malware detection technique of monitoring and detecting changes in data reducibility can serve as an indication of malware activity and, more generally, compromised data and/or unexpected data modifications in scenarios where the incoming data received by the storage system is unencrypted (e.g., not expected to be encrypted) such as by a host sending the data. However, if normal data processing includes the host, such as a host agent or application, providing the storage system with encrypted data, then any subsequent re-encryption or undesired modification by malware of the already encrypted data may not result in changes or variations in data reducibility beyond expected tolerances or ranges. Put another way, in normal processing scenarios where the host or application provides the storage system with an encrypted form of data, the foregoing malware detection technique of monitoring and detecting changes in data reducibility may not serve as a good reliable indicator of malware data encryption activity and, more generally compromised data and/or unexpected data modifications made to host-encrypted data.

To overcome at least the foregoing problem or drawback when malware re-encrypts or undesirably modifies host-encrypted data, the techniques of the present disclosure can be used. In at least one embodiment, the techniques of the present disclosure can be used to detect or determine when malware has modified or re-encrypted host-encrypted data, where such host-encrypted data has been validly and intentionally generated as part of normal processing such as by a host or other client providing the host-encrypted data. In at least one embodiment, a host can encrypt data as part of normal processing prior to sending the data in its encrypted form to a storage system.

In at least one embodiment in normal processing (e.g., without malware data modifications or malware encryption), the storage system can expect to receive encrypted data from the host, and the storage system can subsequently properly decrypt the received host-encrypted data to obtain the valid original data (as prior to host encryption). In at least one embodiment, the host providing the storage system with encrypted data can be performed as part of normal processing for any suitable reason such as for security and/or privacy in accordance with specified guidelines, standards and/or policies.

In at least one embodiment, the techniques of the present disclosure can be used to detect when malware has further re-encrypted the host-encrypted data where the re-encrypted data (as re-encrypted by the malware) is received at the storage system. Thus, in at least one embodiment, the storage system can utilize the techniques of the present disclosure to detect such malware re-encryption of host-encrypted data, where the malware re-encrypted data is received by the storage system. More generally, in at least one embodiment, the storage system can utilize the techniques of the present disclosure to detect when the host-encrypted data has been unknowingly modified, such as by malware, to generate modified compromised data (e.g., the malware modified host-encrypted data), where the modified compromised data is received by the storage system.

In at least one embodiment, the malware can be executing code that modifies the host-encrypted data at any point prior to reaching the storage system. In at least one embodiment, the malware can be code that executes on a host that performs the host-encryption of the data, where the malware can further re-encrypt the host encrypted data prior to sending to the storage system. In at least one embodiment, the malware can be executing code on the storage system, or component thereof, where the malware modifies the host-encrypted data once received at the storage system. In at least one embodiment, the malware can be executing code on a component that intercepts host-encrypted data at some point between the host and storage system. Generally in at least one embodiment, the modification to the host-encrypted data such as performed by the malware can include re-encrypting the host-encrypted data. More generally, the modification or malware-based re-encryption of the host-encrypted data as performed by the malware can be characterized as invalidating, unexpectedly modifying and/or compromising the host-encrypted data, and can potentially result in a data loss and/or data unavailability.

In at least one embodiment, the techniques of the present disclosure can include detecting, using a first method, a potential or suspected malware activity impacting a first storage object having content that is not encrypted by a sending host. The first method can obtain a first set of one or more characteristics describing one or more corresponding changes in behavior with respect to I/O activity of the first storage object. In at least one embodiment, the first method can determine a change to a reducibility ratio with respect to the first storage object where such a change indicates suspected malware activity impacting the first storage object.

In at least one embodiment, the first method may fail to detect any potential or suspected malware activity impacting a second storage object having content that is encrypted by a sending host. For example, the first method may fail to detect any change with respect to a reducibility ratio with respect to the second storage object with respect to host-encrypted content that has been re-encrypted by malware, where detecting such a reducibility change would indicate suspected malware activity impacting the second storage object. Once the first method has detected suspected malware activity impacting the first storage object but not the second storage object, one or more additional methods or techniques can be used to further characterize the behavior of the suspected malware activity impacting the first storage object. The one or more additional methods or techniques can result in obtaining a second set of one or more characteristics describing one or more additional changes in behavior with respect to the I/O activity of the first storage object. An indication of compromise (IOC) can be created for the suspected malware activity impacting the first storage object having content that is not encrypted by a sending host. The IOC can be a record that includes a signature of characteristic changes in I/O activity and/or data patterns observed or collected around the time of the detected suspected malware activity impacting the first storage object. The signature of the IOC can include the first set of one or more characteristics and the second set of one or more characteristics indicating changes to I/O activity of the first storage object impacted by the suspected malware activity.

In at least one embodiment, the IOC can also include other metadata related to the suspected malware activity impacting the first storage object. In at least one embodiment, the metadata of the IOC can include information identifying any of: the particular one or more hosts that use or access the first storage object, the particular one or more hosts that write to the first storage object, the particular host application that issues I/Os to the first storage object, and/or the particular host application that writes to the first storage object.

In at least one embodiment, the IOC can then be used generally in connection with detecting suspected malware activity impacting the second storage object as well as other storage objects. For example, elements of the signature of the IOC can be compared to second information characterizing observed I/O activity changes of the second storage object to determine matches and/or similarities between corresponding portions of the second information and the signature elements of the IOC. In a least one embodiment, there can be a first match between one or more of the second set of characteristics of the IOC signature and one or more corresponding characteristics of the second information characterizing observed I/O activity changes of the second storage object. In at least one embodiment, there may not be any match between the first set of characteristics of the IOC signature and corresponding characteristics of the second information. By determining, for the second storage object, the foregoing first match with respect to the second set of characteristics of the IOC signature rather than the first set of one or more characteristics of the IOC signature, the techniques of the present disclosure can detect a potential or suspected malware activity impacting the second storage object.

In at least one embodiment, the IOC can be shared such that its signature and/or metadata can be searched and compared to values of respective characteristics of other storage objects. Techniques or methods such as the first method noted above may be unable to detect suspected malware activity on the other storage objects such as those storing host-encrypted content. However in at least one embodiment, additional characteristics of the IOC signature can be used and compared to corresponding characteristics of the I/O activity changes of the other storage objects to detect suspected malware activity impacting the other storage objects.

Additionally in at least one embodiment, elements of the IOC metadata can be used to identify candidate storage objects to test for potential suspected malware activity. For example, the IOC metadata can indicate that the first storage object is accessed by a particular application APP1 of a particular host H1. Processing can be performed to determine a set of other storage objects also accessed by the particular application APP1 of the particular host H1, where the set of other storage objects can be candidates to test for potential suspected malware activity.

The foregoing and other aspects of the techniques of the present disclosure are described in more detail in the following paragraphs.

Figure 3:
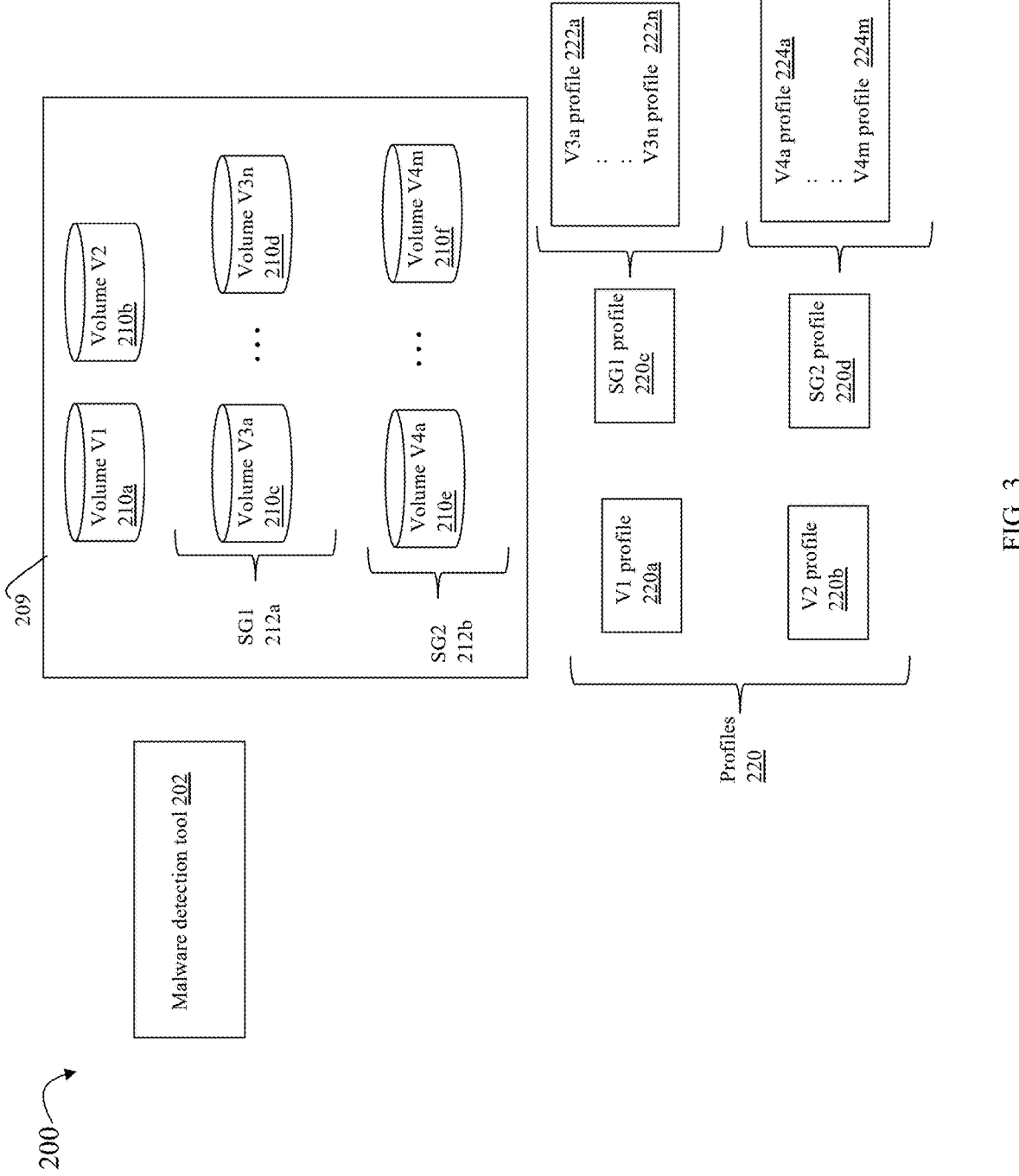

Referring to FIG. 3, shown is an example 200 of components that can be used in at least one embodiment in accordance with the techniques of the present disclosure.

In at least one embodiment, the components of 200 can be included in a single storage system such as a single storage array.

The example 200 includes malware detection tool (sometimes referred to as a malware detector, detector or tool) 202; logical storage devices or volumes 209 comprising volumes 210a-f; and profiles 220. Although elements 210a-f denote logical storage devices or volumes, such as LUNs or volumes of block storage in accordance with the SCSI standard or the NVMeoF (NVMe over Fabric, where the fabric can be FC or TCP) standard, more generally, elements 210a-f can denote any suitable type of one or more storage objects supported in the data storage system. The volumes 210a-f can be exposed to one or more hosts having applications executing thereon that access one or more of the volumes 210a-f such as by issuing read and/or write I/Os to one or more of the volumes 210a-f.

Generally, the malware detection tool 202 can be implemented using any suitable combination of software or executable code and/or hardware. For example, the tool 202 can include executable code that runs on processors or cores of the storage system, or a hardware component of the storage system.

In at least one embodiment, the profiles 220 can include information characterizing the expected I/O workload or activity of I/Os directed to the storage volumes, or more generally, storage objects such as volumes 209. In at least one embodiment, the profile 220 can include per-volume, or more generally, per storage object expected I/O workload or activity characteristics.

In at least one embodiment, the malware detection tool 202 can perform processing described in more detail in the following paragraphs. In at least one embodiment, the malware detection tool 202 can perform processing including monitoring activity and characteristics of I/O workload directed to volumes 209. In at least one embodiment, such monitoring can include monitoring reducibility measurements such as one or reducibility ratios of newly written content to the volumes 209, where such reducibility ratios can include any of compression ratios and deduplication ratios. In at least one embodiment, such monitoring with respect to a single volume can include monitoring I/O-based characteristics including any one or more of: read I/O size, write I/O size, read/write workload mixture or ratio, percentage or portion of I/O workload that are reads, percentage or portion of I/O workload that are writes, compressibility or compression ratio, data deduplication ratio, I/O pattern characteristics, whether the read I/O workload is sequential or random, whether the write I/O workload is sequential or random, overall host I/O rate (e.g., host I/Os per second), host write I/O rate (e.g., host write I/Os per second), host read I/O rate (e.g., host read I/Os per second), I/O locality of reference (e.g., the particular logical addresses accessed by received I/O operations where a host can be expected to repeatedly access the same set of logical addresses of a volume such as within a specified time period), read I/O locality of reference (e.g., the particular logical addresses accessed by received read I/O operations where a host can be expected to read repeatedly from the same set of logical addresses of a volume such as within a specified time period), and/or write I/O locality of reference (e.g., the particular logical addresses accessed by received write I/O operations where a host can be expected to write repeatedly to the same set of logical addresses of a volume, such as within a specified time period). In at least one embodiment, the malware detection tool 202 can monitor and detect changes to any one or more of the foregoing with respect to a volume, storage group or other supported storage object. In at least one embodiment, detected changes can be subject to corresponding acceptable tolerances, ranges or variations depending on the particular characteristic or metric. In at least one embodiment, the malware detection tool 202 can perform processing including generating and/or updating information of the profiles 220.

In at least one embodiment, a storage group or SG can be a logically defined group of one or more volumes. In at least one embodiment, one or more volumes can be grouped in the same SG based on application usage. In at least one embodiment, an SG can denote a set of one or more volumes used by a particular application, a particular type of application, or multiple instances of the same application. SG1

212a can denote an SG of n volumes 210c-d, where "n" can denote an integer value of 2 or more; and SG2 212b can denote an SG of m volumes 210e-f, where "m" can denote an integer value of 2 or more.

In at least one embodiment, the particular I/O activity or workload characteristics of a particular volume or SG used by one or more applications or instances of one or more host. In this manner in at least one embodiment, each volume and/or SG can have its own profile denoting expected characteristics of the particular I/O activity or workload with respect to the application, application type and/or one or more application instances that generally use or access the particular volume or SG.

In at least one embodiment, separate volumes can be created and used by each host application or each host application type. In at least one embodiment, multiple instances of the same host application or the same type of host application can share the same one or more volumes. In at least one embodiment, use of a particular volume and/or SG can be by any of: a single application instance on a single host, multiple application instances of the same application or application type on the same single host, or multiple application instances of the same application or application type on multiple hosts.

To further illustrate in at least one embodiment, consider a first scenario where the volume 210a can be used by a single application instance of a single host. For example, the host 14a can include multiple instances of the same application, such as two instances I1, I2 of the same database or email application APP1 executing thereon. In this first scenario, a single one of the two instances I1, I2 of APP1 (but not both I1 and I2) of the single host 14a can read data from and/or write data to volume 210a. For example, only I1 of APP1 of host 14a can read data from and write data to volume 210a; and similarly only I2 of APP1 of host 14a can read data from and write data to volume 210b.

As a variation in at least one embodiment, consider a second scenario where the volume 210a can be used by multiple application instances of the same application or application type of a single host. In this second scenario, both I1 and I2 of APP1 of the single host 14a can read data from and write data to volume 210a. However, in the second scenario, other instances I3 and I4 of APP1 executed on one or more hosts (e.g., 14b-n) other than the host 14a may not be allowed to read data from and/or write data to volume 210a.

As a variation at least one embodiment, consider a third scenario where the volume 210a can be used by multiple application instances of the same application or application type of multiple hosts. In this third scenario, host 14a can include I1 and I2 of APP1 as noted above. Additionally, host 14b can include the additional instances I3 and I4 of the same application or application type, APP1. In this third scenario, all instances I1, I2, I3 and I4 of APP1 on hosts 14a-b can read data from and write data to volume 210a.

Thus, the particular volume(s) used by particular applications and application instances on a particular host can vary. In a similar manner, the particular SG used by particular applications and application instances on a particular host can vary.

To further illustrate in at least one embodiment, consider a fourth scenario where the SG1 212a can be used by a single application instance of a single host. For example, the host 14a can include multiple instances of the same application, such as two instances I1, I2 of the same database or email application APP1 executing thereon. In this fourth scenario, a single one of the two instances I1, I2 of APP1

(but not both I1 and I2) of the single host 14a can read data from and/or write data to SG1 212a. For example, only I1 of APP1 of host 14a can read data from and write data to SG1 212a; and similarly only I2 of APP1 of host 14a can read data from and write data to SG2 212b.

As a variation in at least one embodiment, consider a fifth scenario where the SG1 212a can be used by multiple application instances of the same application or application type of a single host. In this fifth scenario, both I1 and I2 of APP1 of the single host 14a can read data from and write data to SG 212a. However, in the fifth scenario, other instances I3 and I4 of APP1 executed on one or more hosts (e.g., 14b-n) other than the host 14a may not be allowed to read data from and/or write data to SG1 212a.

As a variation at least one embodiment, consider a sixth scenario where the SG1 212a can be used by multiple application instances of the same application or application type of multiple hosts. In this sixth scenario, host 14a can include I1 and I2 of APP1 as noted above. Additionally, host 14b can include the additional instances I3 and I4 of the same application or application type, APP1. In this sixth scenario, all instances I1, I2, I3 and I4 of APP1 on hosts 14a-b can read data from and write data to the same SG1 212a.

Generally, an embodiment can allow any suitable application-volume usage relationships and application-SG usage relationships including any supported combination of scenarios some of which are noted above. For example, in at least one embodiment, volume 210a can be used only by the multiple instances I1 and I2 of the same application APP1 on host 14a; volume 210b can be used only by the multiple instances I3 and I4 of the same application APP1 on host 14b; and only instances I5 and I6 of a second application or application type APP2 on host 14a and instance I7 of the second application or application type APP2 on host 14b can use SG1 212a.

The profiles 220 can include profiles 220a-d. Generally the profiles 220 can be I/O profiles characterizing expected I/O activity or workload of storage objects, such as volumes and SGs.

In at least one embodiment, the V1 profile 220a can denote the profile for volume V1 209a; the V2 profile 220b can denote the profile for volume V2; the SG1 profile 220c can denote the profile for SG1 212a; and the SG2 profile 220d can denote the profile for SG2 212b.

In at least one embodiment, the SG1 profile 220c can further include per-volume profiles for volumes 210c-d comprising SG1 212a. To further illustrate, the SG1 profile 220c can include separate, individual per volume profiles for volumes V3a 210c-V3n 210d of SG1 212a, for example, where V3a profile 222a denotes the profile for volume V3a 210d, and where V3n profile 222n denotes the profile for volume V3n 210d.

In at least one embodiment, the SG2 profile 220d can further include per-volume profiles for volumes 210e-f comprising SG2 212b. To further illustrate, the SG2 profile 220d can include separate, individual per volume profiles for volumes V4a 210e-V4m 210f of SG2 212b, for example, where V4a profile 224a denotes the profile for volume V4a 210e, and where V4m profile 224m denotes the profile for volume V4m 210f.

In at least one embodiment, a profile for a volume can include one or more expected values of various characteristics where metrics can be used to characterize the I/O workload or activity. The profile for a volume can also identify an acceptable range of values for a particular characteristic or metric where the acceptable range denotes a range of expected values of the particular characteristic or metric for a corresponding volume. In at least one embodiment, the acceptable expected ranges can be expressed as a number of standard deviations from a normal distribution. In at least one embodiment, the acceptable range of values can be included in profile matching criteria used in connection with determining matches between the profile and observed characteristic values for a current I/O workload or activity of a storage object. In at least one embodiment, a profile can include expected values for characteristics where one or more of the characteristics can denote a classification or category. For example, a profile can include an expected value classifying at the expected I/O workload or activity as one of sequential or random. As another example, a profile can include an expected value classifying the expected read I/O workload or activity as one of: read sequential or random read; and the profile can include another expected value classifying the write I/O workload or activity as one of: write sequential or random write.

In at least one embodiment, a profile for a volume can include one or more expected values of reducibility ratios such as any one or more of a compression ratio and a deduplication ratio. In at least one embodiment, the profile for a volume can include an acceptable range of reducibility ratios, where the acceptable range of values can be included in profile matching criteria used in connection with determining matches between the profile and observed characteristic values for a current I/O workload or activity of a storage object. For example in at least one embodiment, the profile for a volume can include any one or more of: an acceptable range of compression ratios and an acceptable range of deduplication ratios. The acceptable ratio ranges can be expressed in any suitable manner. In at least one embodiment, the acceptable expected ratio ranges can be expressed as a number of standard deviations from a normal distribution. For example, a compression ratio can be expected to fall within $+/-K$ standard deviations of the mean of the normal distribution, where K can be an integer equal to or greater than 1. For example, in at least one embodiment for at least one reducibility ratio, the corresponding acceptable range can be defined where $K=1$. As another example, in at least one embodiment for at least one reducibility ratio, the corresponding acceptable range can be defined where $K=2$. Other suitable ways for expressing acceptable reducibility ratio ranges in at least one embodiment can include explicitly specifying a numeric range of values.

In at least one embodiment, the malware detection tool 202 can generate an initial set of profiles 220 for the volumes 209. In at least one embodiment, the detector or tool 202 can generate per-volume profiles 220 for each of the individual volumes 209. The initial set of profiles 220 can be generated or otherwise obtained in any suitable manner. For example, in at least one embodiment, the profiles 220 can be generated during an initialization time period based on content or data written to, and stored on, each of the volumes 209. As a variation in at least one embodiment, one or more of the profiles 220 can be provided by a distributor, vendor or provider of particular applications that use particular ones of the volumes 209. For example, assume a database application DB1 uses volume V1 210a as a log volume and uses volume V2 210b as a database volume for storing content of the database. A distributor, vendor or provider of DB1 can provide profiles for 220a-b, respectively, for volumes 210a-b that are exclusively used only by DB1, or one or more instances of DB1, where the one or more instances of DB1 can generally by on a single host or on multiple hosts depending on embodiment and configuration thereof.

In at least one embodiment, for an SG X1 of multiple storage objects such as multiple volumes, rather than have per-volume or per storage object profiles, a corresponding profile for the SG X1 can include a single collective profile characterizing the behavior, activity, and/or workload of all storage objects of the SG X1. In this case, the expected characteristics across all storage objects of SG X1 can be expected to be approximately the same or similar, within specified tolerances or ranges. For example, if SG X1 includes 2 volumes U1, U2, the profile for SG1 can include a single compressibility metric such as a single compression ratio denoting the expected compression ratio for both volumes U1 and U2.

Generally, data generated and used by different host applications or host application types tends to exhibit different usage and thus different expected values for characteristics denoting the I/O workload or activity. However, individual host applications, such as a particular email or database program, or an individual storage object used by a particular application for a particular purpose, tend to create, use and/or store host application data exhibiting particular expected values for particular I/O workload or activity characteristics within respective predictable ranges. When new content is written to the storage object, a calculated value of a characteristic for the new content can be determined. The calculated value can be compared to an expected value for the characteristic as included in the corresponding profile for the storage object. The profile can also indicate, for the particular characteristic, an acceptable value range of expected values for the storage object. Processing can be performed to determine whether the calculated value matches the profile of the storage object. A match can be indicated if the calculated value falls within the acceptable value range indicated by the profile. If a match is determined thereby indicating that there is no unexpected change with respect to the characteristic of the storage object, then the newly written content is indicated as not impacted by malware activity such as malware encryption of the newly written content. However, if a match is not determined thereby indicating that there is an unexpected change with respect to the particular characteristic of the storage object, then the newly written content can be indicated as impacted by suspected malware activity such as malware encryption of the newly written content. In at least one embodiment, malware activity can be suspected for new content written to a storage object if, in accordance with the storage object's profile of expected values, the new content is associated with unexpected changes with respect to corresponding values of one or more specified I/O workload or activity characteristics.

Consistent with other discussion herein, host application data (generally data) received at the storage system from a host can be either host-encrypted or unencrypted as part of normal I/O processing. Content or data from particular volumes or portions thereof that are expected to be host-encrypted or unencrypted can be known to the host and storage system such as based on previously established or defined information provided to the host and storage system.

Generally, data generated and used by different host application or host application types tends to exhibit different reducibility in terms of compression and dedup ratios. However, individual host applications, such as a particular email or database program, or an individual storage object used by a particular application for a particular purpose, tend to create, use and/or store host application data exhibiting compression and dedup ratios within a predictable range. Compressibility and deduplicability tend to also change as a result of malicious encryption. For example, maliciously encrypted data as compared to the original unencrypted data may be less compressible or have fewer redundancies that can be deduplicated. Thus, when unencrypted data is subject to malicious encryption, the associated compression and dedup ratios tend to unexpectedly decrease and can thus be used in at least one embodiment as a means for detecting suspected malware activity such as malicious encryption. In at least one embodiment, unexpected changes in compression and/or deduplication ratios for content written to a storage object can signal or indicate malicious encryption when the content written is expected to be unencrypted data.

In at least one embodiment, a profile for the storage object can be created including one or more expected reducibility ratios for the storage object. The one or more reducibility ratios can include a deduplication ratio and/or compression ratio. When new content is written to the storage object, a calculated reducibility ratio for the new content can be determined. The calculated reducibility ratio can be compared to an expected reducibility ratio as included in the corresponding profile for the storage object. The profile can also indicate an acceptable value range of expected reducibility ratio values for the storage object. Processing can be performed to determine whether the calculated reducibility ratio matches the profile of the storage object. A match can be indicated if the calculated reducibility ratio falls within the acceptable value range indicated by the profile. If a match is determined thereby indicating that there is no unexpected change with respect to the reducibility ratio of the storage object, then the newly written content is indicated as not impacted by malware activity such as malware encryption of the newly written content. However, if a match is not determined thereby indicating that there is an unexpected change with respect to the reducibility ratio of the storage object, then the newly written content is indicated as impacted by suspected malware activity such as malware encryption of the newly written content. Generally, if unencrypted data has been subjected to malware encryption, the reducibility ratios (e.g., deduplication and compression ratios) of the malware encrypted data will decrease in comparison to expected reducibility ratios of the unencrypted data. Generally, the reducibility ratios of the malware encrypted data will be zero, or approximately near zero within specified tolerances. In contrast, the reducibility ratios of the original unencrypted data can be non-zero such that there can be a detected change (e.g., decrease) in the reducibility ratios when original unencrypted data has been malware encrypted.

However, detecting a change in a reducibility ratio as means for determining when a storage object has been impacted by malicious data encryption does not serve as a good malware activity indicator when the data of the storage object is expected to be purposefully encrypted by the host or other storage client such as part of normal processing. With host-encrypted data, the expected value of the reducibility ratio can be typically zero or near zero. In the event of a subsequent malware re-encryption of the host-encrypted data, the calculated value of the reducibility ratio for the malware re-encrypted data can also be expected to be zero or near zero. In this manner, there can typically be no detected change or difference with the respect to the expected value and the calculated value of the reducibility ratio.

To overcome the above-noted limitation in connection with detecting suspected malware activity such as malware encryption of data the techniques of the present disclosure can perform processing described below. In the following paragraphs, examples can be provided using storage objects that are volumes. More generally, the techniques of the present disclosure can be used with storage groups or other suitable storage objects.

In at least one embodiment, content of a first storage object SO1 can be unencrypted as part of normal I/O processing and content of a second storage object SO2 can be host-encrypted as part of normal I/O processing. An application can read and/or write to both SO1 and SO2. At a first point in time, an unexpected change in values for a first characteristic C1 can be detected with respect to SO1 but not SO2. In at least one embodiment, the first characteristic C1 can be a reducibility ratio, such as a compression ratio or a data deduplication ratio. Responsive to detecting the unexpected change for C1 with respect to SO1 but not SO2, I/O activity or workload directed to SO1 can be further monitored to obtain additional values for one or more additional characteristics C2. For example in at least one embodiment, the one or more additional characteristics C2 can include any of: I/O size, classification of I/O stream (e.g., classification as one or more of: sequential, random, sequential read, sequential write, random read, and random write). Unexpected changes with respect to values for the additional characteristics C2 can be collected for SO1. An IOC can be created that includes a signature with respect to the unexpected changes in values for C1 as well as the additional characteristics C2 for SO1. The signature can generally define the behavior or signature of the suspected malware activity, where the signature includes the unexpected changes in characteristics C1 and C2 of the I/O workload or activity as detected for SO1. Additionally in at least one embodiment, I/O activity or workload directed to SO2 can be further monitored to obtain additional values for the same one or more additional characteristics C2 where unexpected changes with respect to the one or more additional characteristics C2 can also be detected for SO2. Processing can be performed to determine whether any unexpected changes in values of the additional characteristics C2 for SO2 match corresponding unexpected changes of C2 in the IOC. In at least one embodiment, the foregoing match can be performed with respect to one or more IOC matching criteria. If processing determines a match between the IOC signature and unexpected changes observed in values of C2 for SO2, SO2 can be suspected as impacted (e.g., compromised, modified and/or invalidated) by malware, and in particular, suspected of the same malware activity as SO1. Thus in at least one embodiment, matches between the IOC signature and unexpected changes in values of the additional characteristics C2, rather than C1, can be used to detect suspected malware activity in SO2. In at least one embodiment, unexpected changes with respect to one or more I/O workload or activity characteristics C2 other than a reducibility ratio can indicate that the storage object SO2 is suspected of being impacted (e.g., compromised, modified and/or invalidated) by the malware activity characterized by the IOC signature.

In at least one embodiment, the techniques of the present disclosure can detect, for a storage object, unexpected changes with respect to one or more I/O workload or activity characteristics other than a reducibility ratio, where such unexpected changes can indicate that the storage object is suspected of being impacted (e.g., compromised, modified and/or invalidated) by malware.

In at least one embodiment, the IOC matching criteria can include one or more conditions. In at least one embodiment where the IOC matching criteria includes multiple conditions, the IOC matching criteria can further specify that if any single condition is met, a match can be determined between the IOC signature and unexpected changes of I/O workload of SO2 to thereby determine that SO2 is suspected of malware activity matching the IOC signature.

In at least one embodiment where the IOC matching criteria includes multiple conditions, the IOC matching criteria can further specify one or more particular combinations of conditions that must be met in order to determine a match between the IOC signature and unexpected changes of I/O workload of SO2 to thereby determine that SO2 is suspected of malware activity matching the IOC signature.

In at least one embodiment, the IOC matching criteria used to determine a match between unexpected changes in characteristics of SO2 and the IOC signature can specify that unexpected changes to at least N characteristics for SO2 must match corresponding unexpected changes of the IOC signature in order to determine that SO2 is suspected of malware activity matching the IOC signature. N can be any suitable non-zero integer. In at least one embodiment, the IOC matching criteria can specify a condition indicating that one or more particular characteristics must match (e.g., are required to match) to determine that SO2 is suspected of malware activity matching the IOC signature.

In at least one embodiment, the IOC matching criteria can define a first set of first one or more characteristics and a second set of second one or more characteristics, and can further specify that a match can be determined between unexpected changes of I/O workload of SO2 and the IOC signature if there is a match between unexpected changes for at least a specified quantity Q1 of characteristics of the first set and/or a match between unexpected changes for at least a specified quantity Q2 of characteristics of the second set. For example in at least one embodiment, the first set of characteristics can include one or more reducibility ratios or characteristics (e.g., compression ratio and/or deduplication ratio), the second set of characteristics can include one or more additional characteristics, Q1=1, and Q2 can be any suitable integer greater than zero. If there is an unexpected first change in values of the reducibility ratio of the first set for SO2, where the unexpected first change matches the IOC signature, an IOC signature match can be determined for SO2. If there are second unexpected changes in values for at least Q2 characteristics of the second set for SO2, where the second unexpected changes match the IOC signature, an IOC signature match can be determined for SO2. In connection with the foregoing in at least one embodiment, an IOC signature match can be determined with respect to SO2 if there are matching unexpected changes with respect to characteristics of either the first set or the second set.

Further examples of the use of the techniques of the present disclosure are provided in more detail in the following paragraphs.

Figure 4:
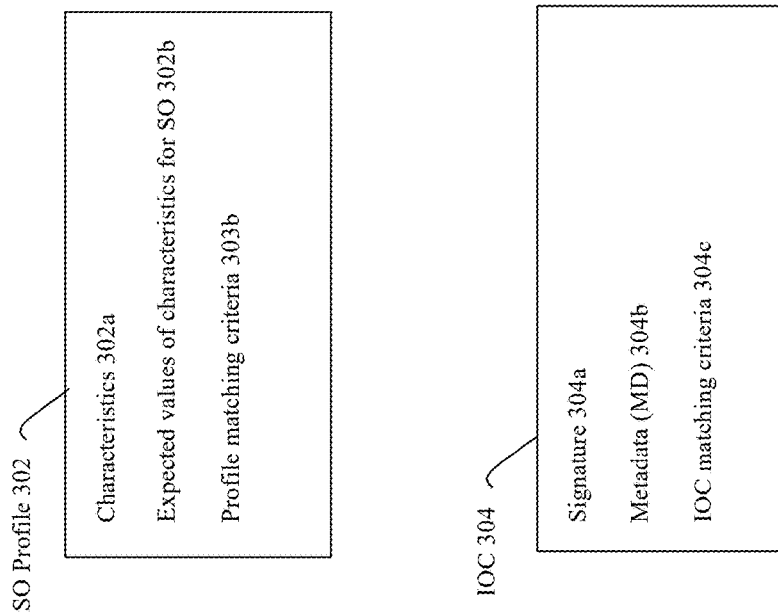

Referring to FIG. 4, shown is an example 300 illustrating contents that can be included in profiles and IOCs in at least one embodiment in accordance with the techniques of the present disclosure. The example 300 summarizes content that can be included in each profile consistent with other discussion herein.

The example 300 includes SO (storage object) profile 302 representing an I/O profile for a particular SO. The profile 302 can include characteristics 302a, expected values 302b for the particular SO where the expected values correspond to the particular characteristics of 302a; and profile matching criteria 302c. In at least one embodiment, the profile matching criteria 302c can vary with the particular characteristics 302a having expected value 302b in the profile 302. For example, profile matching criteria 302c can identify a first acceptable value range for a first characteristic C1; and can identify a second acceptable value range for a second characteristic C2, where the foregoing first and second acceptable value ranges can vary with the particular corresponding characteristic and corresponding expected value. Consistent with discussion herein in at least one embodiment, the profile matching criteria can generally identify conditions or criteria used in determining whether there is a match between an expected value Ex of a characteristic Cx of the profile 302 and an observed or measured value Mx for the same characteristic Cx. In at least one embodiment, an acceptable value range Rx for a corresponding characteristic Cx can be included in profile matching criteria 302c for Cx. Rx can include the expected value Ex as well as denote a range variation or deviation with respect to Ex, where if Mx falls within Rx, a match can be determined between Mx and the profile 302. In this manner in one aspect, the acceptable range Rx for Cx can denote a range of expected values denoting expected behavior or activity with respect to I/O workload or activity of the corresponding SO. If Mx falls within Rx, it can be determined that Mx is an expected value for Cx for the corresponding storage object SO.

It should be noted that specifying an acceptable range in the profile matching criteria 302c for a particular characteristic Cx can be optional and vary with the particular characteristic. In at least one embodiment, profile matching criteria may be omitted for one or more characteristics sometimes due to the nature of the particular characteristic. For example, a characteristic Cx can denote a write I/O workload as sequential or random for SO. In this case, the profile 302 can include a flag or indicator to denote whether the write I/O workload is sequential or random. For example in at least one embodiment, the profile can specify Ex as either an "R" to denote an expected write I/O workload of random or an "S" to denote an expected write I/O workload of sequential. In this case, Ox can also be either R or S, where determining a match between Ox and Ex can include comparing Ox to Ex to determine whether they both denote the same value of R or S.

The example 300 also includes an IOC 304 denoting an IOC record of information describing a detected IOC. The IOC 304 can include a signature 304a, metadata (MD) 304b, and IOC matching criteria 304c.

Consistent with other discussion herein, the signature 304a serves as the malware fingerprint identifying the detected unexpected changes with respect to one or more characteristics of I/O workload and activity, where the detected unexpected changes of the signature 304a define or characterize the behavior or impact of the suspected malware on I/O workload and activity of a storage object. In at least one embodiment, the signature 304a can identify one or more characteristics for which unexpected changes have been detected with respect to a particular storage object, where the unexpected changes can be included or identified in the signature 304a. For example, in at least one embodiment, an unexpected change can be detected with respect to write I/O rate (e.g., write I/Os per second or write IOPS) for write I/Os writing content to the volume V1. The unexpected change can denote a change in the write I/O rate for V1 from K1 to K2, where K1 can denote the expected value included in the profile 302 for a V1. For example, the write I/O rate can increase from K1 to a larger size K2 such as where K1=10 write IOPS and where K2=300 write IOPS. In at least one embodiment, the values K1 and K2 denote average write I/O rates. The profile for V1 can including profile matching criteria identifying an acceptable range of values of write IOPS for V1 such as 10 write IOPS+/−2 write IOPS (e.g., range from 8-12 IOPS). In this case an unexpected change in write IOPS can be detected for V1 since K2=300 does not fall within the acceptable range of values. In at least one embodiment, the IOC signature 304a can identify the foregoing unexpected change in write IOPS for V1 by identifying the characteristic of write I/O rate or write IOPS, and also identifying the unexpected observed value K2=300 write IOPS.

In at least one embodiment, the IOC matching criteria 304c can generally specify one or more criteria used in connection with determining whether observed unexpected changes in characteristics of I/O workload or activity for a storage object match the IOC 304, and in particular match the signature 304a of the IOC 304c. Consistent with other discussion herein, the IOC matching criteria 304c can include one or more conditions that must be met or satisfied (e.g., evaluate to true) in order to determine that observed unexpected changes in characteristics of I/O workload or activity for a storage object match the IOC 304, and in particular match the signature 304a. Examples of such conditions of 304c are discussed elsewhere herein.

In at least one embodiment, the IOC matching criteria 304c can also specify ranges of values in a manner similar to the acceptable ranges of the profile matching criteria 302c for suitable corresponding characteristics. In at least one embodiment, a range Ry of values of the IOC matching criteria 304c can be used in a manner similar to the acceptable range Rx of values of the profile matching criteria with a difference that the Ry of 304c for a corresponding characteristic Cy can be used in determining whether an observed unexpected value Jy for Cy matches the IOC signature 304c. In at least one embodiment, processing can determine whether Jy matches a corresponding unexpected change UCy for Cy, where UCy with respect to Cy can be included in the signature 304a. In embodiments where UCy is denoted by an unexpected value UVy in the IOC signature 304a, even if Jy does not equal UVy, in some cases an acceptable range Ry of values can be specified in the IOC matching criteria 304c, where Ry corresponds to UCy and Cy. In particular in at least one embodiment, UVy can denote an unexpected value that falls into the range Ry, and additionally, if the observed unexpected value Jy falls into the range Ry, then it can be determined that Jy matches the IOC signature 304c, and more specifically matches UCy of 304a (e.g., Jy matches the unexpected change UCy for the characteristic Cy, where UCy is included in the IOC signature 304a).

In at least one embodiment, the metadata 304b of the IOC for a storage object suspected of being impacted by malware can include information identifying any of: the particular one or more hosts that use or access the corresponding storage object, the particular one or more hosts that write to the storage object, the particular host application that issues I/Os to the first storage object, the particular host application that writes to the first storage object and/or an application signature of the host application that accesses the storage object.

As further illustrated example of the techniques of the present disclosure in at least one embodiment, consider a host such as the host 14a and a first application APP1, where a first instance I1 of APP1 can be executing on the host H1 14a. The host H1 14a can be connected to the storage system 12 and the first instance I1 of APP1 executing on the host H1 14a can use two volumes V1 210a and V2 210b such that the I1 of APP1 issues read and/or write I/Os to the volumes V1 210a and V2 210b of the storage system 12.

Reference in the following paragraphs is made to FIGS. 5, 6A and 6B, where FIG. 5 includes an example 400 of profiles and observed characteristic values in at least one embodiment in accordance with the techniques of the present disclosure, and where FIGS. 6A and 6B include steps of a flowchart 500, 501 of processing steps that can be performed in at least one embodiment in accordance with the techniques of the present disclosure.

At the step 502, I1 of APP1 on host H1 can write content to the volume V1 210a that is unencrypted; and the same instance I1 of APP1 can also write content to the volume V2 210b that is encrypted by the host. More generally, content written to and stored on V1 is unencrypted and expected to be received by the storage system from the host H1 in an unencrypted form; and content written to and stored on V2 is encrypted and can be expected to be received by the storage system in an encrypted form based on expected encryption performed by the host H1. From the step 502, control proceeds to the step 504, At the step 504, during a time period T1, the malware detection tool can monitor the I/O workload and activity of both V1 and V2. The malware detection tool can execute on the storage system including the volumes V1 and V2. Monitoring by the malware detection tool can include monitoring a first set of one or more characteristics. The first set can be a selected set of one or more characteristics that are I/O-related or I/O based characteristics that characterize I/O workload and activity of a volume. The first set can be a limited subset of one or more characteristics having corresponding expected values in the profiles for V1 and V2. For example, the first set can include a single characteristic that is a reducibility ratio such as a compression ratio (CR). In at least one embodiment, the first set of characteristics monitored by the malware detection tool can be a limited number or portion of allowable characteristics that can be monitored by the malware detection tool. In at least one embodiment, the limited number of characteristics of the first set can be monitored as opposed to a larger set of possibly all allowable characteristics in an ongoing basis in order to reduce the amount of CPU and other storage system resources consumed in an ongoing basis by the malware detection tool.

Figure 5:
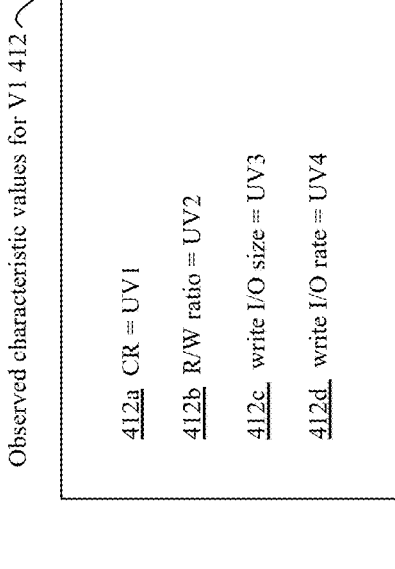
Figure 5:
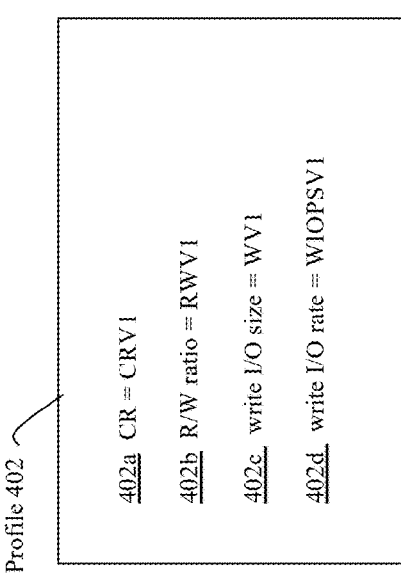
Figure 5:
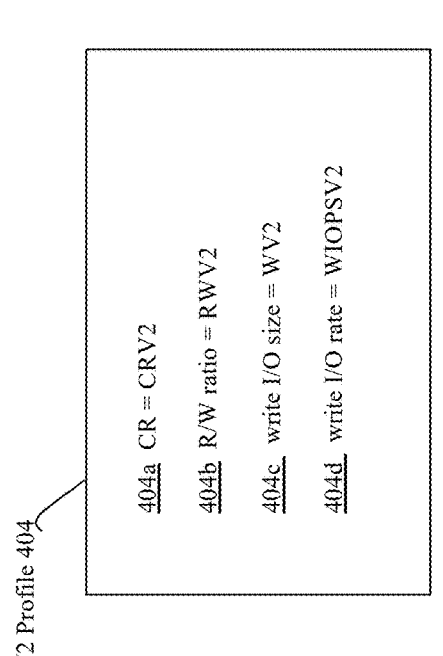

FIG. 5 includes profile 402 for volume V1 and profile 404 for volume V2. The profile 402 for V1 includes expected values 402a-d and the profile 404 for V2 includes expected values 404a-d. Element 402a denotes the expected value for a CR for V1 and element 404a denotes the expected value for a CR for V2. FIG. 5 also includes observed characteristic value sets 412 and 414 denoting observed characteristic values, respectively, for V1 and V2 obtained as result of the malware detection tool monitoring for characteristics. In particular, elements 412a and 414a can denote CR values obtained as a result of monitoring during T1 in step 504. From the step 504, control proceeds 506.

At the step 506, responsive to monitoring during T1, the malware detection tool detects an unexpected change in CR values for V1 based on V1's profile, and does not detect any unexpected change in CR values for V2 based on V2's profile. The unexpected change in CR values for V1 signals or denotes suspected malware activity impacting V1. Consistent with discussion elsewhere herein, detecting an unexpected CR value for V1 can include determining whether the observed CR value of UV1 412a matches the expected CR value CRV1 402a of V1's profile 402. Although not explicitly illustrated in FIG. 5, each of the profiles 402, 404 can include profile matching criteria, such as acceptable value ranges, for corresponding characteristics of the profiles 402, 404. For example, the profile matching criteria of 402 can include a first acceptable range R1 where detecting an unexpected change in CR for V1 can include determining that UV1 is not included in R1. The profile matching criteria of 404 can include a second acceptable range R2 where detecting an expected change in CR for V2 can include determining that CRV2 414a falls within R2. From the step 506, control proceeds to the step 508.

At the step 508, as a result of detecting (in step 506) the unexpected change in CR values for V1 and thus suspecting malware activity has impacted V1, an additional set of one or more additional characteristics can be monitored by the malware detection tool for V1 and V2 during a second time period T2. The additional set can include I/O-related or I/O based characteristics that characterize I/O workload and activity of a volume. Characteristic of the additional set can have corresponding expected values in the profiles for V1 and V2. For example, the additional set can include the following characteristics: R/W ratio (read/write I/O ratio denoting a ratio of read I/O workload to write I/O workload), write I/O size and write I/O rate. During T2, the malware detection tool can also continue to monitor the one or more characteristics of the first set with respect to V1 and V2 along with the additional characteristics of the additional characteristic set.

During T2, monitoring characteristics of the additional set with respect to V1 can be performed to gather or collect additional I/O-related behavioral or activity information regarding observed unexpected changes in I/O workload or activity of V1, where such unexpected changes can be used to further characterize and define the behavior or signature of the suspected malware impacting V1.

Thus in at least one embodiment, additional storage system resources can be used in connection with monitoring and collecting values of the additional set of characteristics once there is a signal or trigger of suspected malware activity such as determined in the step 506 by detecting the unexpected change in CR values for V1.

Referring again to FIG. 5, elements 402b-d denote the expected values for the characteristics of the additional set for V1, and elements 404b-d denote the expected values for the characteristics of the additional set for V2. Consistent with other discussion herein, acceptable ranges can be included in profile matching criteria of the profiles 402, 404 for each of the characteristics in the additional set for use in determining whether an observed characteristic value is unexpected (e.g., where an unexpected observed value not matching the profile does not fall within a corresponding acceptable range; and where otherwise an expected observed value matching the profile does fall within the corresponding acceptable range). Elements 412b-d denote the observed characteristic values for V1 that correspond respectively to the expected values 402b-d of V1's profile 402. In particular, UV2 412b denotes the observed value for the R/W ratio for V1; UV3 412c denotes the observed value for the write I/O size for V1; and UV4 412d denotes the observed value for the write I/O rate for V1.

Elements 414b-d denote the observed characteristic values for V2 that correspond respectively to the expected values 404b-d of V2's profile 404. In particular, UV12 414b denotes the observed value for the R/W ratio for V2; UV13 414c denotes the observed value for the write I/O size for V2; and UV14 412d denotes the observed value for the write I/O rate for V2. In this example, unexpected values can be determined with respect to observed characteristic values 412b-d and also 414b-d in the step 508.

From the step 508, control proceeds to the step 510.

At the step 510, an IOC can be created, such as by the storage system, for the suspected malware activity impacting V1. The IOC can include a signature based on the unexpected changes observed with respect to characteristics of the first set and the additional set for V1. The IOC can also include MD including other information regarding V1. The MD can include information identifying any of: the application or application type APP1; the host H1 upon which I1 of APP1 executes; other hosts that access or use (e.g., read from and/or write to) V1; and other hosts with other instances of the same application/application type APP1 that access or use V1.

In this example, unexpected changes in values can be determined with respect to observed characteristic values 412*a-d* for V1. In this manner, the IOC signature can identify a first unexpected change with respect to the CR (as detected in step 504) and can further identify 3 unexpected changes for all 3 characteristics of the additional set (e.g., where the 3 characteristics are R/W ratio, write I/O size and write I/O rate). For example in at least one embodiment, the IOC signature can indicate the unexpected values of 412*a-d* denoting unexpected changes, respectively, to characteristics CR, R/W ratio, write I/O size and write I/O rate. From the step 510, control proceeds to the step 512.

At the step 512, processing can be performed to identify one or more other volumes, or other storage objects, that are candidates potentially impacted by malware activity described by the signature of the IOC. Processing can identify volume V2 of the storage system as a candidate.

In at least one embodiment in the step 512, portions of the IOC can be compared to corresponding information of other volumes or storage objects to identify candidates potentially impacted by malware activity described by the signature of the IOC. For example, processing can determine any matches between first unexpected changes in observed characteristic values for V2 and corresponding second unexpected changes in characteristic values of the IOC signature. For example, processing can determine matches between the IOC signature and first unexpected changes in observed characteristic values for R/W ratio, write I/O rate and write I/O size for V2, whereby V2 is thus identified as a candidate based, at least in part, on the foregoing matches.

In at least one embodiment in the step 512, configuration information of the storage system can be searched to identify one or more other volumes or storage objects that are candidates potentially impacted by malware activity corresponding to the IOC. For example, processing of step 512 can determine any matches between the IOC MD and configuration information other volumes or storage objects. For example, configuration information INFO1 for V2 can identify: the application/application type APP1 that accesses V2; and the particular host H1 that accesses V2. Processing of step 512 can compare INFO1 for V2 to the MD of the IOC and determine matches between INFO1 and the MD the IOC. In this example such MD matches can conclude or determine that both V1 and V2 are accessed/used by the same host H1 and accessed/used by the same application/application type APP1, whereby V2 is thus identified as candidate based, at least in part, on the foregoing MD matches. Based on the foregoing IOC MD matches, further analysis can be performed with respect to V2, where such further analysis can include determining any matches between unexpected changes in observed characteristic values for V2 and corresponding unexpected changes in characteristic values of the IOC signature. For example as noted above, processing can determine matches between the IOC signature and first unexpected changes in observed characteristic values for R/W ratio, write I/O rate and write I/O size for V2, whereby V2 is thus further confirmed as a candidate based, at least in part, on the foregoing matches. From the step 512, control proceeds to the step 514.

At the step 514, processing can determine whether unexpected changes in observed characteristic values for V2 match the IOC based, at least in part, on 1) the matching criteria of the IOC and 2) the matches determined in step 512 between unexpected changes in observed characteristic values for V2 and corresponding unexpected changes in characteristic values of the IOC signature.

In this example, the matching criteria can include a first condition that specifies if at least a minimum number MIN of unexpected changes in observed characteristic values of the additional set for V2 match the IOC signature, then a match is determined between the IOC signature and the unexpected changes in observed characteristic values for V2, where V2 is determined to have been impacted by malware activity described by the IOC signature. In this example, MIN can be 1 or more, and where for V2, unexpected changes in observed characteristic values for R/W ratio, write I/O rate and write I/O size are determined in the step 512 to match corresponding unexpected changes of the IOC signature. Thus the candidate volume V2 has sufficient matching unexpected changes that match the IOC signature and meet the specified matching criteria.

It should be noted that an embodiment can specify matching criteria that is not met or true even though there can be matches between the observed unexpected changes of a storage object and the IOC signature. For example as a variation to the above, MIN of the first condition can be 3 and there may be volume Vx for which only 1 or 2 matches are determined between the IOC signature and the observed unexpected changes for characteristics of the additional set characteristics with respect to Vx. In this case, assuming that the matching criteria only includes the above-noted variation of the first condition with MIN=3, the observed unexpected changes in characteristics for Vx can be determined not to meet the matching criteria, where it can be concluded that there is no match between the IOC and the observed unexpected changes in characteristics for Vx. As a result of no match in this latter scenario, Vx may not be suspected of being impacted by malware activity described by the IOC. From the step 514, control proceeds to the step 516.

At the step 516, the IOC can be shared with one or more other storage systems such that the one or more other storage systems can also similarly identify other candidates potentially impacted by malware activity described by the IOC. Processing to identify other candidates can include the other storage systems searching their respective configuration information for marches with IOC MD; and determining matches between unexpected changes in observed characteristic values for storage objects and corresponding unexpected changes in characteristic values of the IOC signature. Consistent with discussion above, processing can determine that a storage object is suspected of being impacted by malware activity described by the IOC if observed unexpected changes in characteristics match the IOC, including having IOC signature matches that meet the specified one or more matching criteria.

In at least one embodiment, an IOC created as a result of detecting unexpected changes in characteristic values with respect to a storage object SO, such as volume V1, can be further classified or tagged as either denoting a valid event, or otherwise denoting an invalid event or threat. In at least one embodiment, a user can be allowed to designate an IOC as either a valid event or an invalid event. The valid event designation can indicate that the behavior regarding changes in characteristic values of the IOC signature are valid changes to the profile of the corresponding SO such as V1. For example, the characteristic value changes for V1 as denoted by the IOC signature and as denoted by the observed characteristic values 412 can be valid changes, deviations and/or variations to the characteristics of V1's profile 402. Such changes, deviations and/or variations can be the result of valid user action. In this case, the IOC can be tagged as a valid event and, if detected again, will not activate or result in subsequent searching for other storage objects that are suspected of being impacted by malware activity described by the IOC. To further illustrate, there can be an unexpected change in observed values for characteristics of a volume Vk during specific dates and times when a particular activity is performed with respect to data stored on Vk. For example, processing can be performed to backup Vk at specific dates and times to a target location. As a result, there can be changes in I/O workload or activity such as 1) a change in the R/W ratio or workload mixture, and 2) a change in the read I/O rate. An IOC created for Vk denoting the foregoing changes can be marked, such as by a user, as a valid event. As a result, the storage system will not raise alerts or trigger processing as described herein upon detecting future subsequent changes in characteristic values matching the IOC signature. In at least one embodiment, marking or designating an IOC as a valid event can include a time period when the IOC is considered a valid event. For example, the time period when an IOC is considered a valid event can include further designating specified times, days of the week, and the like, when the IOC is a valid event, such that if the IOC occurs outside of the designated time period, the IOC can be considered an invalid event. For example, if the particular activity such as the above-noted backup activity occurs during a particular day of the week and/or particular time of day, then the particular day and/or time of date are designated time periods of when the IOC event is considered a valid event, and otherwise, the IOC event occurrence can be considered an invalid event.

In at least one embodiment as discussed herein, the malware detection tool of the storage system can initially detect an unexpected change with respect to the first set of one or more characteristics thereby triggering subsequent processing to: collect additional I/O related behavioral or activity information regarding the storage object suspected of being impacted by malware activity; create an IOC; and then subsequently search for other storage objects whose observed I/O activity can be compared to the IOC to determine whether any of the other storage objects are also suspected of being impacted by malware activity denoted by the IOC.

In at least one embodiment, a host or other component can also or alternatively initially detect an unexpected change with respect to the first set of one or more characteristics thereby triggering the subsequent processing.

In at least one embodiment, once a storage object, such as the volume V2, is identified as having unexpected changes in characteristics matching an IOC, V2 can be characterized as suspected of being impacted by malware activity characterized by the IOC (and in particular the IOC signature). Subsequently, an embodiment can perform processing or take one or more actions. The one or more actions can include processing to actually validate the contents of V2. Put another, the action taken to validate V2 can include processing to determine whether the contents of V2 has been unexpectedly modified, corrupted and/or compromised. The particular action taken and the particular processing performed to validate a storage object can vary with the particular storage object and usage in an embodiment. For example, V2 can be a volume used by an application, such as a database application where there can be a known expected format or layout to the contents of V2. In particular, the format or layout of V2 can store particular known values in particular fields at particular locations on V2. For example, a first field of V2 stored at a first expected location may indicate a valid version number or valid ID of the database application. If the current contents of the first field of V2 is read from V2 and determined not to include a valid version number of valid ID of the database application, then it can be determined that V2 data validation has failed (e.g., V2 has actually been modified, corrupted and/or compromised by suspected malware activity characterized by the IOC). In a similar manner, there can be multiple such fields whose current contents can be read from V2 to determine whether the current contents include valid data for the particular fields.

In at least one embodiment, the particular one or more actions taken can also perform other processing such as performing one or more malware countermeasures that attempt to reduce, halt or minimize further access (e.g. reads and/or writes) to the storage object suspected of being impacted by malware activity. For example, an action taken can cease performing certain data services enabled for the storage object such as halting replication of content of the storage object, halting performing a backup of the storage object, and the like. Such actions can include sending an alert message to one or more clients, such as hosts and/or data storage system administrators regarding the suspected malware activity and the impacted storage object.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   monitoring input/output (I/O) activity of a first storage object for changes to a first characteristic set of one or more I/O activity characteristics with respect to the first storage object;
   monitoring I/O activity of a second storage object for changes to the first characteristic set with respect to the second storage object, the first and second storage objects residing within a set of storage devices of storage equipment;
   detecting a first unexpected change to a first characteristic of the first characteristic set with respect to the first storage object, wherein said first unexpected change indicates first suspected malware activity by first malware impacting the first storage object;

41 detecting no unexpected change to the first characteristic with respect to the second storage object; and responsive to said detecting the first unexpected change, performing first processing including:

monitoring I/O activity of the first storage object for changes to an additional characteristic set of one or more additional I/O activity characteristics with respect to the first storage object, wherein the additional characteristic set includes a second characteristic;

detecting a second unexpected change to the second characteristic with respect to the first storage object, wherein said second unexpected change indicates the first suspected malware activity by the first malware impacting the first storage object;

creating a first indication of compromise (IOC) record for the first suspected malware activity by the first malware impacting the first storage object, wherein the first IOC record includes a first signature characterizing behavior of the first suspected malware activity by the first malware impacting the first storage object, wherein the first signature includes the first unexpected change to the first characteristic and also includes the second unexpected change to the second characteristic;

monitoring I/O activity of the second storage object for changes to the additional characteristic set with respect to the second storage object;

detecting a third unexpected change to the second characteristic with respect to the second storage object;

determining, in accordance with one or more IOC matching criteria, that a first set of one or more unexpected changes in I/O activity of the second storage object matches the first IOC record, wherein the first set of one or more unexpected changes in I/O activity of the second storage object includes the third unexpected change; and responsive to determining that the first set of one or more unexpected changes in I/O activity of the second storage object matches the first IOC record, providing an indication of second suspected malware activity by the first malware impacting the second storage object to safeguard the set of storage devices against malware activity;

wherein the first unexpected change indicates that the first characteristic for the first storage object changed from a first expected value to a first unexpected value, and wherein the second unexpected change indicates that the second characteristic for the first storage object changed from a second expected value to a second unexpected value, wherein the first expected value is included in first one or more expected values of a first I/O profile, wherein the second expected value is included in second one or more expected values of a first I/O profile, wherein the first unexpected value and the second unexpected value are determined in accordance with information regarding current I/O activity of the first storage object obtained, respectively, in said monitoring I/O activity of the first storage object for changes to the first characteristic set and said monitoring I/O activity of the first storage object for changes to the additional characteristic set.

2. The computer-implemented method of claim 1, wherein said determining that the first set of one or more unexpected changes in I/O activity of the second storage object matches the first IOC record further includes:

determining that the third unexpected change, to the second characteristic with respect to the second storage object, matches the second unexpected change, to the second characteristic with respect to the first storage object.

3. The computer-implemented method of claim 2, wherein the first I/O profile describes expected I/O activity and behavior for the first storage object, wherein the first I/O profile includes first information specifying the first one or more expected values, respectively, for the one or more I/O activity characteristics of the first set with respect to the first storage object, and wherein the first I/O profile includes second information specifying the second one or more expected values, respectively, for the one or more additional I/O activity characteristics of the additional characteristic set with respect to the first storage object.

4. The computer-implemented method of claim 3, wherein said detecting the first unexpected change to the first characteristic with respect to the first storage object further includes:

determining that the first unexpected value does not fall into a first specified value range including the first expected value, wherein the first specified value range is included in the first I/O profile of the first storage object; and wherein said detecting the second unexpected change to the second characteristic with respect to the first storage object further includes:

determining that the second unexpected value does not fall into a second specified value range including the second expected value, wherein the second specified value range is included in the first I/O profile of the first storage object.

5. The computer-implemented method of claim 2, wherein a second I/O profile describes expected I/O activity and behavior for the second storage object, wherein the second I/O profile includes third information specifying third one or more expected values, respectively, for the one or more I/O activity characteristics of the first set with respect to the second storage object, and wherein the second I/O profile includes fourth information specifying fourth one or more expected values, respectively, for the one or more additional I/O activity characteristics of the additional characteristic set with respect to the second storage object.

6. The computer-implemented method of claim 5, wherein the third unexpected change indicates that the second characteristic for the second storage object changed from a third expected value to a third unexpected value, wherein the third expected value is included in the fourth one or more expected values of the second I/O profile, and wherein the third unexpected value is determined in accordance with information regarding current I/O activity of the second storage object obtained in said monitoring I/O activity of the second storage object for changes to the additional characteristic set with respect to the second storage object.

7. The computer-implemented method of claim 6, wherein said detecting the third unexpected change to the second characteristic with respect to the second storage object includes:

determining that the third unexpected value does not fall within a third specified value range including the third expected value, wherein the third specified value range is included in the second I/O profile.

8. The computer-implemented method of claim 5, wherein the third one or more expected values of the second I/O profile include a fourth expected value denoting an expected value of the first characteristic with respect to the second storage object, wherein a fifth value for the first characteristic with respect to the second storage object is determined in accordance with information regarding current I/O activity of the second storage object obtained in said monitoring I/O activity of the second storage object for changes to the first characteristic set with respect to the second storage object, and wherein said detecting no unexpected change to the first characteristic with respect to the second storage object further includes:

determining that the fifth value falls within a fourth specified value range including the fourth expected value, wherein the fourth specified value range is included in the second I/O profile.

9. The computer-implemented method of claim 6, wherein the second unexpected change is denoted in the first signature of the first IOC record by including the second unexpected value in the first signature of the first IOC record, and wherein said determining that the third unexpected change to the second characteristic with respect to the second storage object matches the second unexpected change included in the first signature of the first IOC record, further includes:

determining that the third unexpected value, of the second characteristic for the second storage object, is a match for the second unexpected value, of the second characteristic for the first storage object, as included in the first signature of the first IOC record, comprising:

determining that the third unexpected value of the second characteristic for the second storage object falls within a fifth specified value range, wherein the fifth specified value range also includes the second unexpected value, of the second characteristic for the first storage object, as included in the first signature of the first IOC record, wherein the fifth specified value range is included in the one or more IOC matching criteria of the first IOC record.

10. The computer-implemented method of claim 9, wherein the one or more IOC matching criteria of the first IOC record specifies one or more criteria used in determining whether the first set of one or more unexpected changes in I/O activity of the second storage object matches the first IOC record, wherein the one or more matching criteria of the first IOC record includes any of:

a first condition specifying that at least a first minimum number of unexpected changes in I/O activity of the first set for the second storage object match the first signature in order to determine that the first set matches the first IOC record;

a second condition specifying that at least a second minimum number of characteristics of the first characteristic set have first corresponding unexpected changes in the first set which match the first signature in order to determine that the first set matches the first IOC record; and a third condition specifying that at least a third minimum number of characteristics of the additional characteristic set have second corresponding unexpected changes in the first set which match the first signature in order to determine that the first set matches the first IOC record.

11. The computer-implemented method of claim 1, wherein the first IOC record further includes first metadata (MD) comprising environmental information regarding the first storage object, wherein the environmental information of the first MD includes first information identifying one or more hosts using or accessing the first storage object, wherein the environmental information of the first MD includes second information identifying an application that issues I/Os to the first storage object, wherein each of the one or more hosts, as identified in the first information, includes at least one instance of the application executing on said each host, and wherein the environmental information of the first MD further includes third information that identifies, for each of the one or more hosts, at least one host operating system upon which one or more instances of the application execute on said each host, and wherein the method further includes:

identifying a third storage object having one or more associated properties matching one or more corresponding elements of the environmental information of the first IOC record;

monitoring I/O activity of the third storage object for changes to the first characteristic set and the additional characteristic set with respect to the third storage object; and determining whether the third storage object has one or more corresponding changes to one or more characteristics matching respective one or more changes of the first signature of the first IOC record.

12. The computer-implemented method of claim 1, wherein each of the first storage object and the second storage object is any of: a volume, a logical device, a data set, and a storage group defining a logical grouping of one or more volumes or logical devices.

13. The computer-implemented method of claim 1, wherein the first storage object and the second storage object are included in a storage system;

wherein first content, that is directed to the first storage object from one or more hosts sending first writes to the storage system, is expected to be in an unencrypted form when received by the storage system; and wherein second content, that is directed to the second storage object from one or more hosts sending second writes to the storage system, is expected to be host-encrypted by a respective sending host when received by the storage system.

14. The computer-implemented method of claim 13, wherein the first characteristic set of one or more I/O activity characteristics includes one or more reducibility ratios;

wherein the first characteristic of the first characteristic set is a first reducibility ratio that is any of a compression ratio and a data deduplication ratio; and wherein each characteristic of the additional characteristic set of one or more additional I/O activity characteristics is any of: read I/O size, write I/O size, read/write workload mixture or ratio, percentage or portion of I/O workload that are reads, percentage or portion of I/O workload that are writes, I/O pattern characteristics, read I/O workload classification as sequential or random, write I/O workload classification as sequential or random, overall host I/O rate, host write I/O rate, host read I/O rate, I/O locality of reference identifying particular logical addresses accessed by received I/O operations, read I/O locality of reference identifying particular logical addresses accessed by received read I/O operations, and write I/O locality of reference identifying particular logical addresses accessed by received write I/O operations.

15. The computer-implemented method of claim 14, wherein another unexpected change denotes an unexpected change between an expected value of the first reducibility ratio and an unexpected value of the first reducibility ratio with respect to the first storage object, wherein the unexpected value of the first reducibility ratio is obtained in connection with said monitoring I/O activity of the first storage object for changes to the first characteristic set of one or more I/O activity characteristics with respect to the first storage object, wherein the expected value of the first reducibility ratio with respect to the first storage object is included in the first I/O profile describing expected I/O activity of the first storage object, and wherein said detecting the first unexpected change further includes:

determining that the unexpected value of the first reducibility ratio does not fall within a fifth specified value range including the expected value of the first reducibility ratio, wherein the fifth expected value range is included in the first I/O profile of the first storage object.

16. The computer-implemented method of claim 15, wherein the second I/O profile, that describes expected I/O activity of the second storage object, includes another expected value of the first reducibility ratio with respect to the second storage object, wherein a third value of the first reducibility ratio with respect to the second storage object is obtained in connection with said monitoring I/O activity of the second storage object for changes to the first characteristic set with respect to the second storage object, wherein said detecting no unexpected change to the first characteristic with respect to the second storage object, further includes:

determining that the second expected value of the second I/O profile matches the third value, comprising determining that the third value falls within a sixth specified value range including the other expected value of the first reducibility ratio, wherein the sixth specified value range is included in the second I/O profile.

17. The computer-implemented method of claim 1, wherein said detecting the first unexpected change to the first characteristic of the first characteristic set with respect to the first storage object indicates that the first storage object is identified as a candidate that has been potentially corrupted, invalidated, compromised and/or modified by the first malware, and wherein the method further includes:

performing data validation processing of the first storage object to determine whether the first storage object has actually been corrupted, invalidated, compromised and/or modified; and wherein said determining that the second suspected malware activity has impacted the second storage object indicates that the second storage object is identified as a candidate that has been potentially corrupted, invalidated, comprised and/or modified by the first malware that also potentially corrupted, invalidated, compromised and/or modified the first storage object, and wherein the method further includes:

performing data validation processing of the second storage object to determine whether the second storage object has actually been corrupted, invalidated, compromised and/or modified.

18. The computer-implemented method of claim 1, further comprising:

based on the first processing, providing an electronic output indicating whether the storage equipment is receiving host-encrypted data that has been re-encrypted by malware.

19. A system comprising:

one or more processors; and a memory comprising code stored thereon that, when executed, performs a method comprising:

monitoring input/output (I/O) activity of a first storage object for changes to a first characteristic set of one or more I/O activity characteristics with respect to the first storage object;

monitoring I/O activity of a second storage object for changes to the first characteristic set with respect to the second storage object, the first and second storage objects residing within a set of storage devices of storage equipment;

detecting a first unexpected change to a first characteristic of the first characteristic set with respect to the first storage object, wherein said first unexpected change indicates first suspected malware activity by first malware impacting the first storage object;

detecting no unexpected change to the first characteristic with respect to the second storage object; and responsive to said detecting the first unexpected change, performing first processing including:

monitoring I/O activity of the first storage object for changes to an additional characteristic set of one or more additional I/O activity characteristics with respect to the first storage object, wherein the additional characteristic set includes a second characteristic;

detecting a second unexpected change to the second characteristic with respect to the first storage object, wherein said second unexpected change indicates the first suspected malware activity by the first malware impacting the first storage object;

creating a first indication of compromise (IOC) record for the first suspected malware activity by the first malware impacting the first storage object, wherein the first IOC record includes a first signature characterizing behavior of the first suspected malware activity by the first malware impacting the first storage object, wherein the first signature includes the first unexpected change to the first characteristic and also includes the second unexpected change to the second characteristic;

monitoring I/O activity of the second storage object for changes to the additional characteristic set with respect to the second storage object;

detecting a third unexpected change to the second characteristic with respect to the second storage object;

determining, in accordance with one or more IOC matching criteria, that a first set of one or more unexpected changes in I/O activity of the second storage object matches the first IOC record, wherein the first set of one or more unexpected changes in I/O activity of the second storage object includes the third unexpected change; and responsive to determining that the first set of one or more unexpected changes in I/O activity of the second storage object matches the first IOC record, providing an indication of second suspected malware activity by the first malware impacting the second storage object to safeguard the set of storage devices against malware activity;

wherein the first unexpected change indicates that the first characteristic for the first storage object changed from a first expected value to a first unexpected value, and wherein the second unexpected change indicates that the second characteristic for the first storage object changed from a second expected value to a second unexpected value, wherein the first expected value is included in first one or more expected values of a first I/O profile, wherein the second expected value is included in second one or more expected values of a first I/O profile, wherein the first unexpected value and the second unexpected value are determined in accordance with information regarding current I/O activity of the first storage object obtained, respectively, in said monitoring I/O activity of the first storage object for changes to the first characteristic set and said monitoring I/O activity of the first storage object for changes to the additional characteristic set.

20. A non-transitory computer readable medium comprising code stored thereon that, when executed, performs a method comprising:

monitoring input/output (I/O) activity of a first storage object for changes to a first characteristic set of one or more I/O activity characteristics with respect to the first storage object;

monitoring I/O activity of a second storage object for changes to the first characteristic set with respect to the second storage object, the first and second storage objects residing within a set of storage devices of storage equipment;

detecting a first unexpected change to a first characteristic of the first characteristic set with respect to the first storage object, wherein said first unexpected change indicates first suspected malware activity by first malware impacting the first storage object;

detecting no unexpected change to the first characteristic with respect to the second storage object; and responsive to said detecting the first unexpected change, performing first processing including:

monitoring I/O activity of the first storage object for changes to an additional characteristic set of one or more additional I/O activity characteristics with respect to the first storage object, wherein the additional characteristic set includes a second characteristic;

detecting a second unexpected change to the second characteristic with respect to the first storage object, wherein said second unexpected change indicates the first suspected malware activity by the first malware impacting the first storage object;

creating a first indication of compromise (IOC) record for the first suspected malware activity by the first malware impacting the first storage object, wherein the first IOC record includes a first signature characterizing behavior of the first suspected malware activity by the first malware impacting the first storage object, wherein the first signature includes the first unexpected change to the first characteristic and also includes the second unexpected change to the second characteristic;

monitoring I/O activity of the second storage object for changes to the additional characteristic set with respect to the second storage object;

detecting a third unexpected change to the second characteristic with respect to the second storage object;

determining, in accordance with one or more IOC matching criteria, that a first set of one or more unexpected changes in I/O activity of the second storage object matches the first IOC record, wherein the first set of one or more unexpected changes in I/O activity of the second storage object includes the third unexpected change; and responsive to determining that the first set of one or more unexpected changes in I/O activity of the second storage object matches the first IOC record, providing an indication of second suspected malware activity by the first malware impacting the second storage object to safeguard the set of storage devices against malware activity;

wherein the first unexpected change indicates that the first characteristic for the first storage object changed from a first expected value to a first unexpected value, and wherein the second unexpected change indicates that the second characteristic for the first storage object changed from a second expected value to a second unexpected value, wherein the first expected value is included in first one or more expected values of a first I/O profile, wherein the second expected value is included in second one or more expected values of a first I/O profile, wherein the first unexpected value and the second unexpected value are determined in accordance with information regarding current I/O activity of the first storage object obtained, respectively, in said monitoring I/O activity of the first storage object for changes to the first characteristic set and said monitoring I/O activity of the first storage object for changes to the additional characteristic set.

* * * * *